G. W. BOWERS.
MACHINE FOR MAKING FILLERS FOR EGG CASES.
APPLICATION FILED NOV. 11, 1916.

1,249,715.

Patented Dec. 11, 1917.
15 SHEETS—SHEET 1.

Inventor:
George W. Bowers,
by Walter E. Lombard
Atty.

G. W. BOWERS.
MACHINE FOR MAKING FILLERS FOR EGG CASES.
APPLICATION FILED NOV. 11, 1916.

1,249,715.

Patented Dec. 11, 1917.
15 SHEETS—SHEET 2.

Inventor:
George W. Bowers,
by Walter E. Lombard,
Atty.

G. W. BOWERS.
MACHINE FOR MAKING FILLERS FOR EGG CASES.
APPLICATION FILED NOV. 11, 1916.

1,249,715.

Patented Dec. 11, 1917.
15 SHEETS—SHEET 3.

Inventor:
George W. Bowers,
by Walter E. Lombard,
Atty.

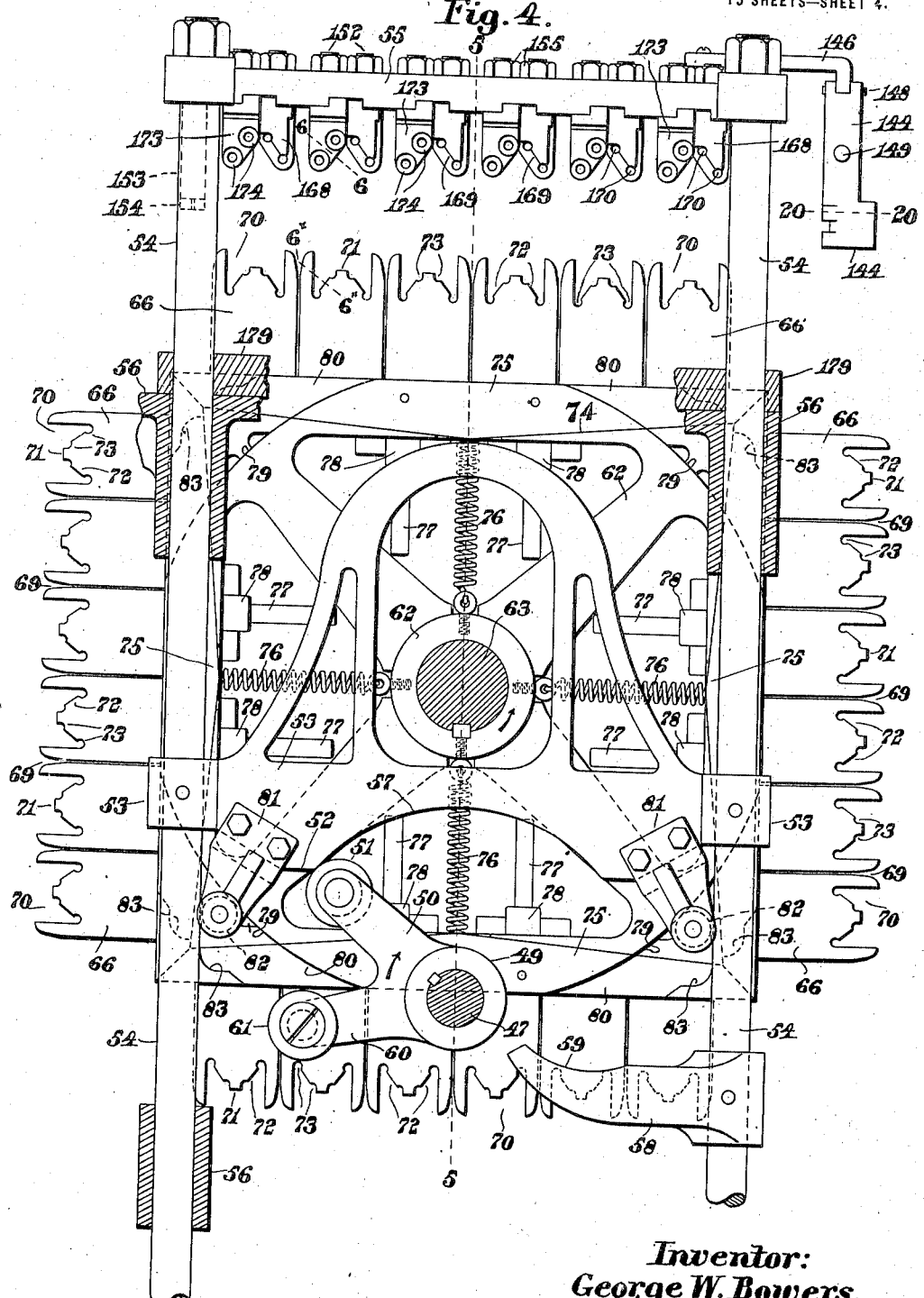

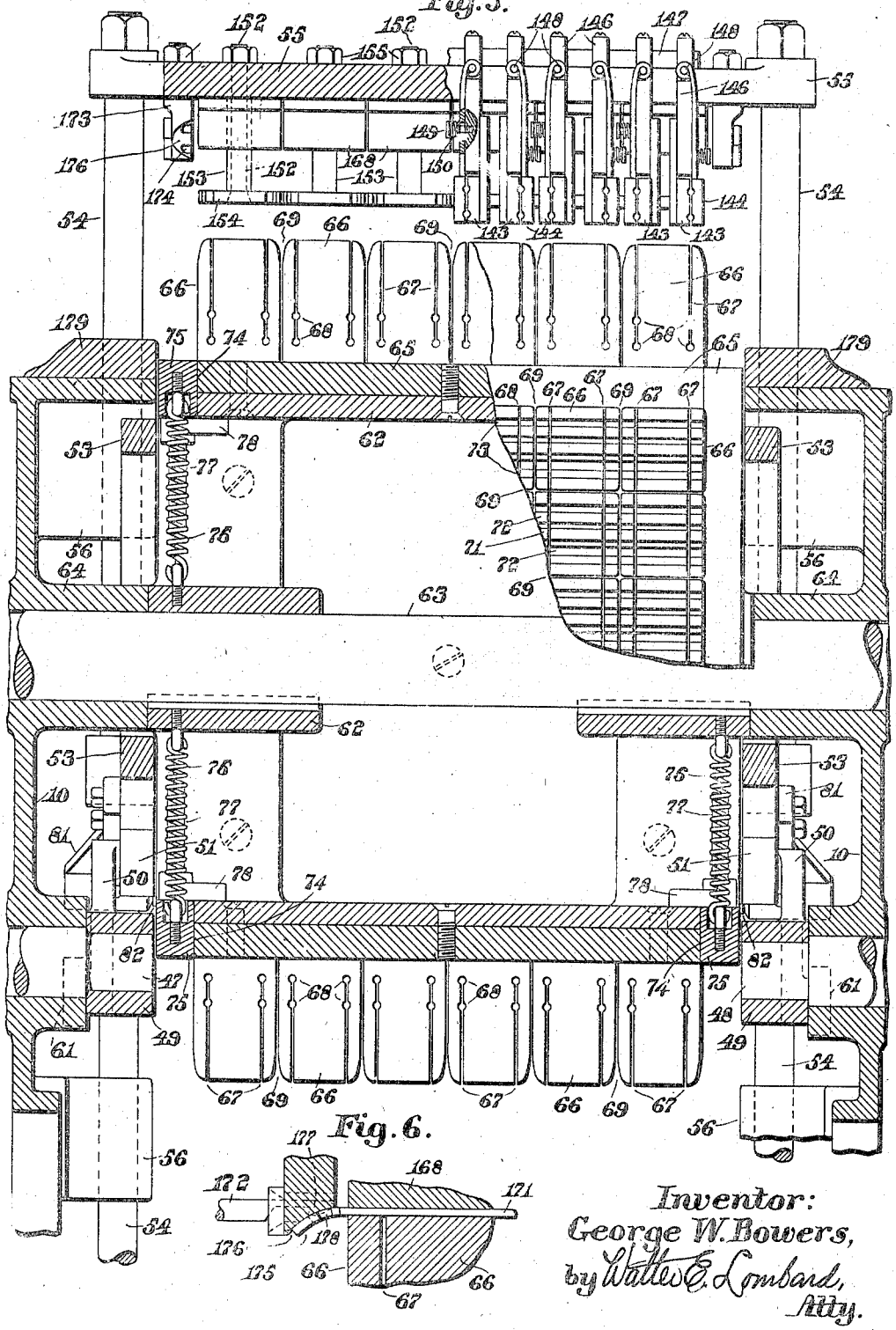

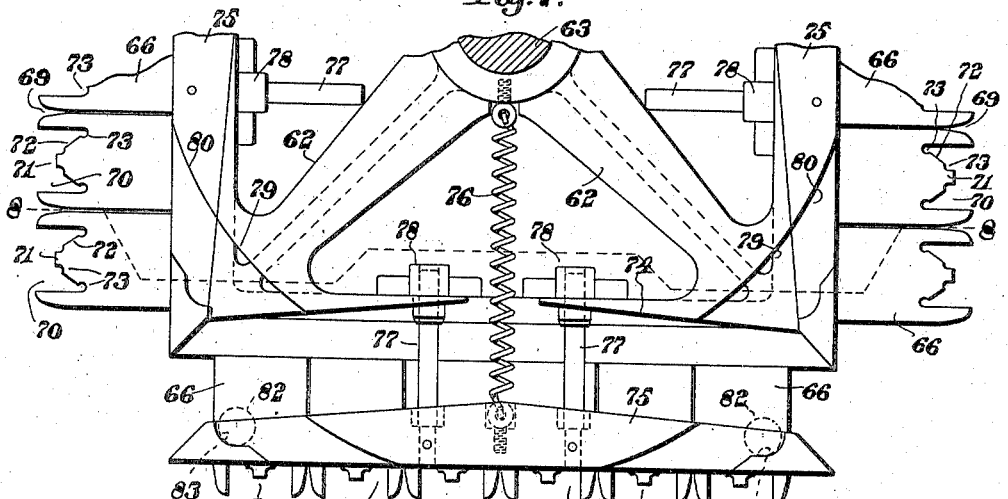
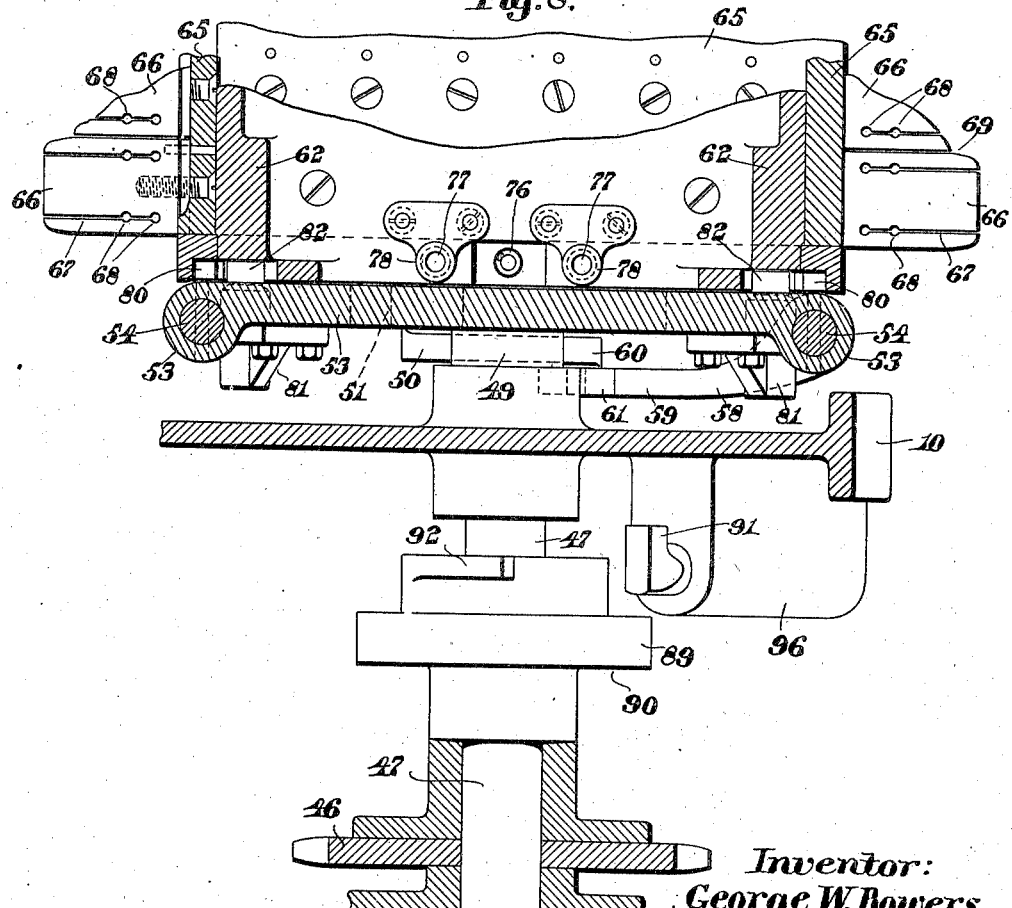

G. W. BOWERS.
MACHINE FOR MAKING FILLERS FOR EGG CASES.
APPLICATION FILED NOV. 11, 1916.

1,249,715.

Patented Dec. 11, 1917.
15 SHEETS—SHEET 7.

Inventor:
George W. Bowers,
by Walter E. Lombard, Atty.

G. W. BOWERS.
MACHINE FOR MAKING FILLERS FOR EGG CASES.
APPLICATION FILED NOV. 11, 1916.

1,249,715.

Patented Dec. 11, 1917.
15 SHEETS—SHEET 8.

Inventor:
George W. Bowers,
by Walter E. Lombard Atty.

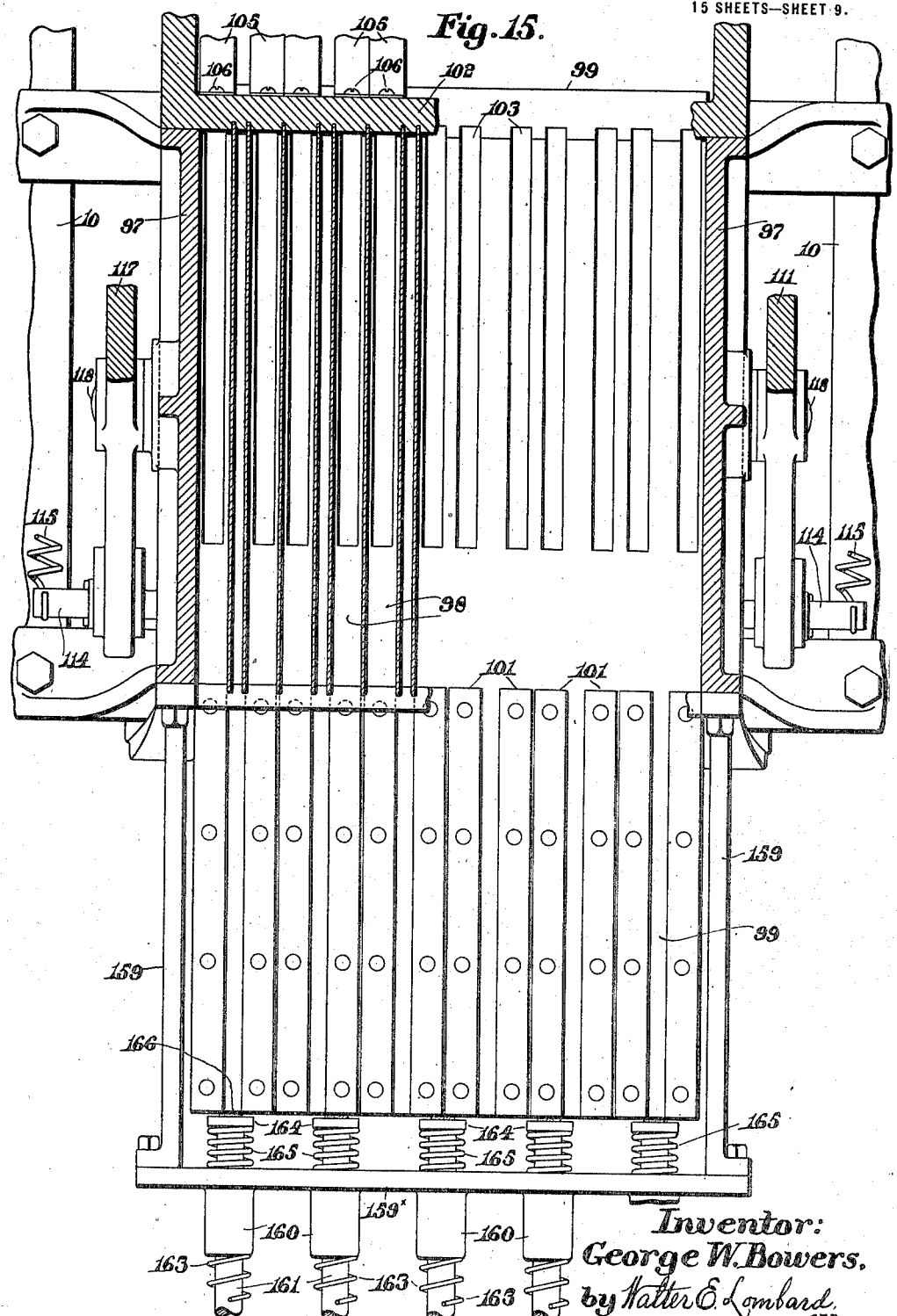

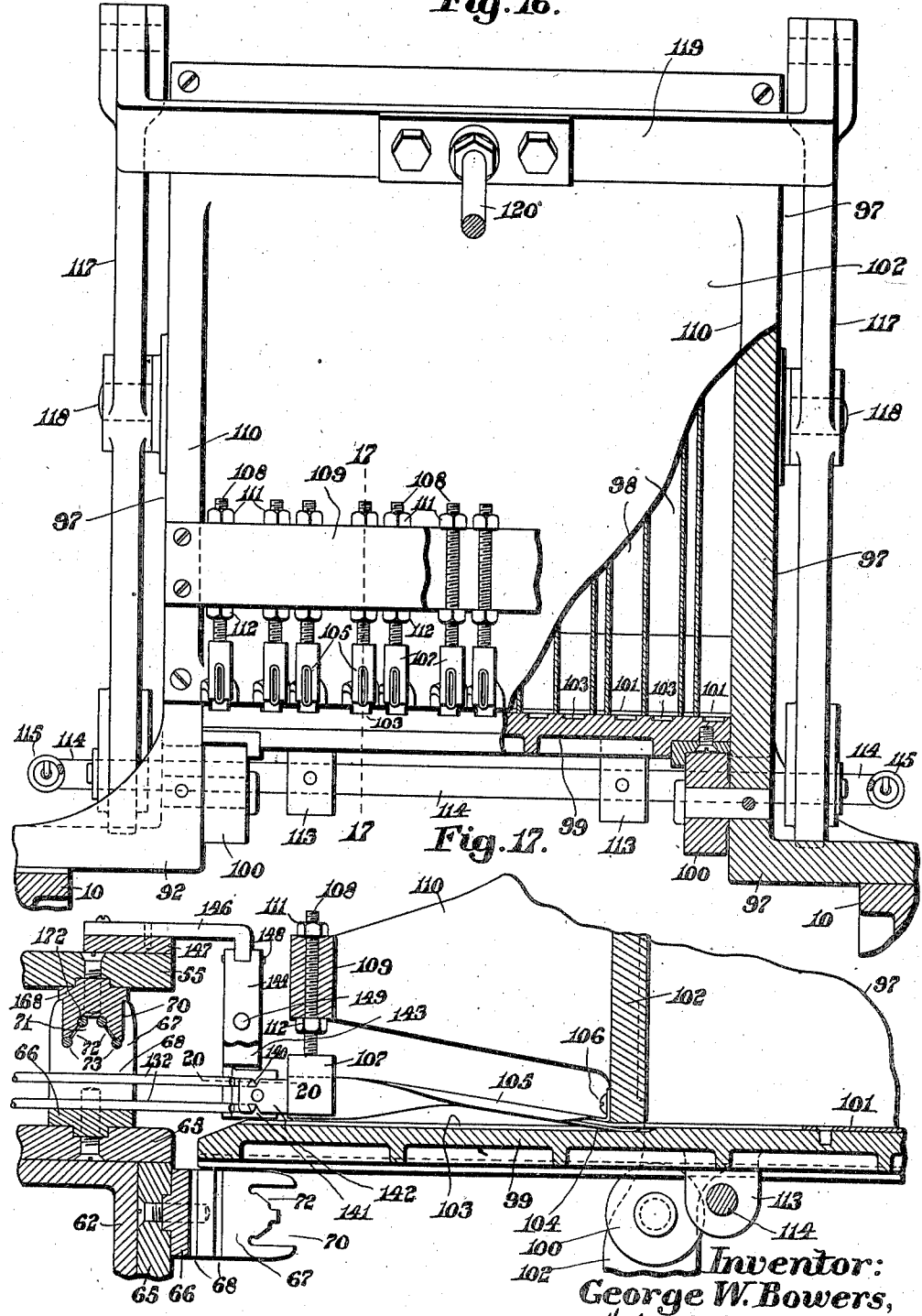

G. W. BOWERS.
MACHINE FOR MAKING FILLERS FOR EGG CASES.
APPLICATION FILED NOV. 11, 1916.

1,249,715.

Patented Dec. 11, 1917.
15 SHEETS—SHEET 11.

Inventor:
George W. Bowers,
by Walter E. Lombard Atty.

G. W. BOWERS.
MACHINE FOR MAKING FILLERS FOR EGG CASES.
APPLICATION FILED NOV. 11, 1916.

1,249,715.

Patented Dec. 11, 1917.
15 SHEETS—SHEET 12.

Inventor:
George W. Bowers,
by Walter E. Lombard,
Atty.

G. W. BOWERS.
MACHINE FOR MAKING FILLERS FOR EGG CASES.
APPLICATION FILED NOV. 11, 1916.
1,249,715.
Patented Dec. 11, 1917.
15 SHEETS—SHEET 13.
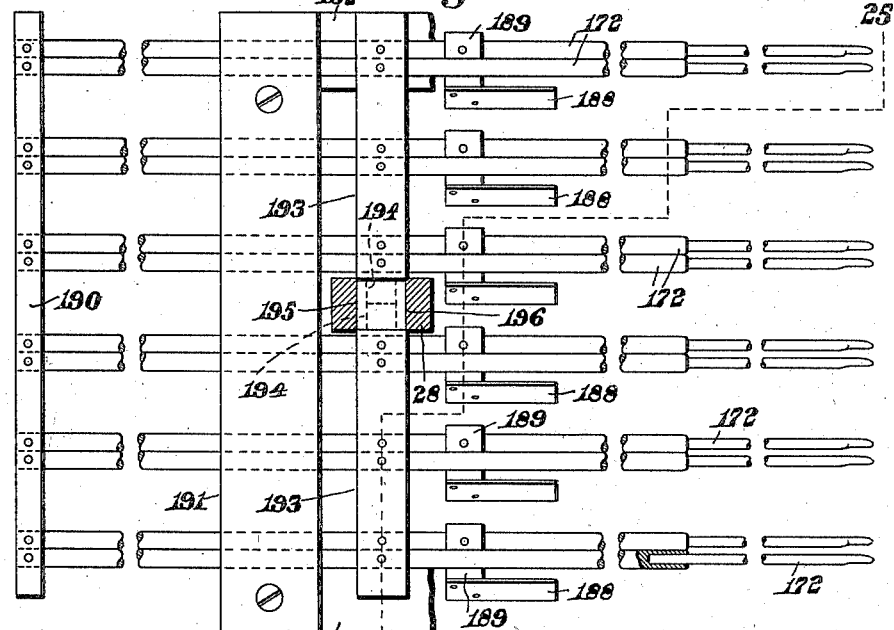
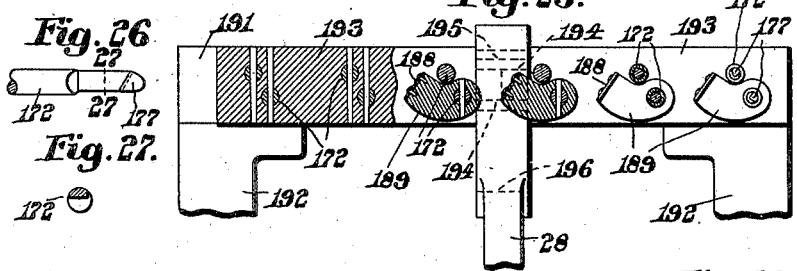
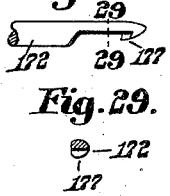
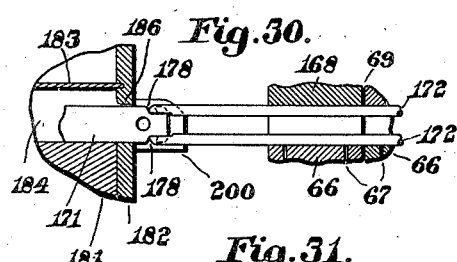
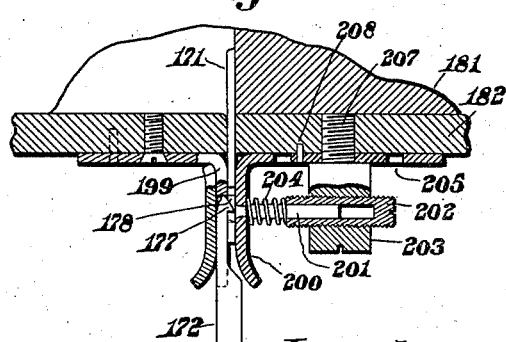
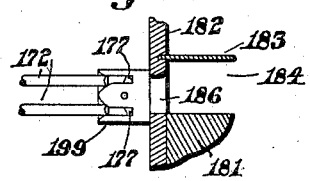
Inventor:
George W. Bowers,
by Walter E. Lombard
Atty.

G. W. BOWERS.
MACHINE FOR MAKING FILLERS FOR EGG CASES.
APPLICATION FILED NOV. 11, 1916.
1,249,715.
Patented Dec. 11, 1917.
15 SHEETS—SHEET 14.
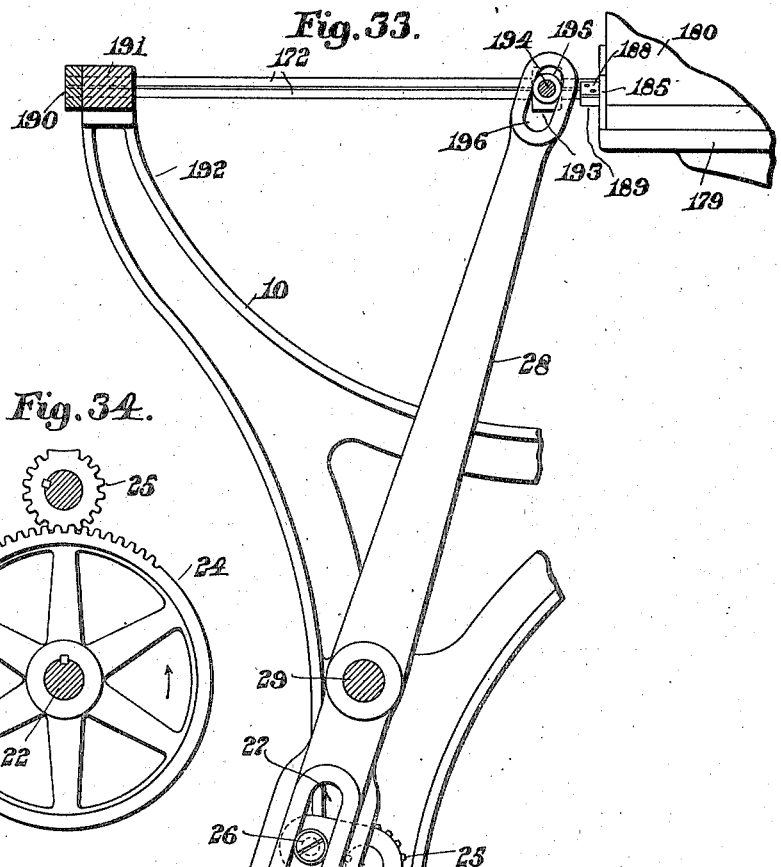
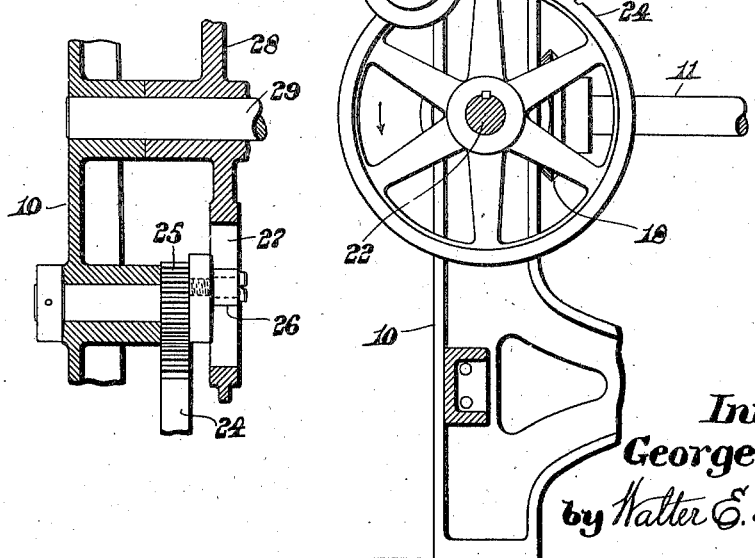
Inventor:
George W. Bowers,
by Walter E. Lombard
Atty.

G. W. BOWERS.
MACHINE FOR MAKING FILLERS FOR EGG CASES.
APPLICATION FILED NOV. 11, 1916.
1,249,715.
Patented Dec. 11, 1917.
15 SHEETS—SHEET 15.
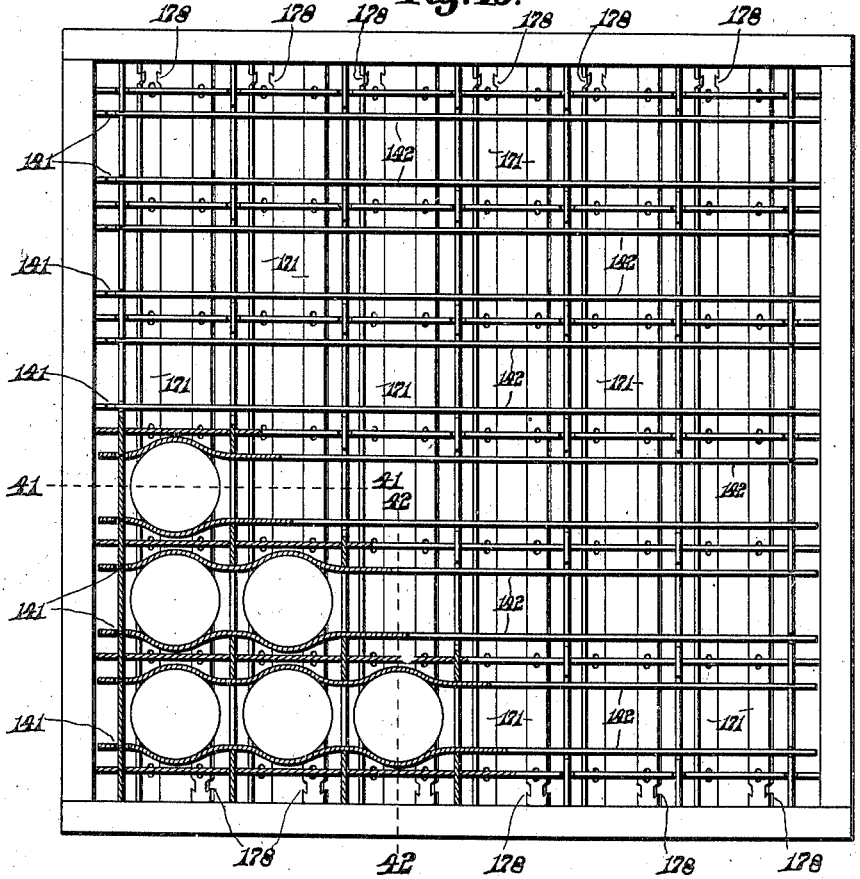
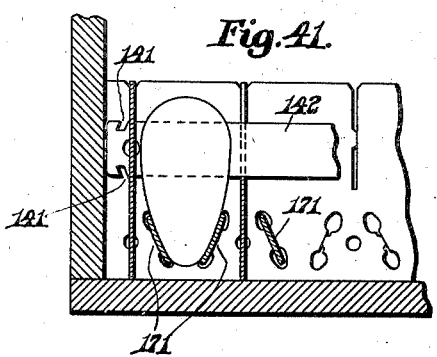
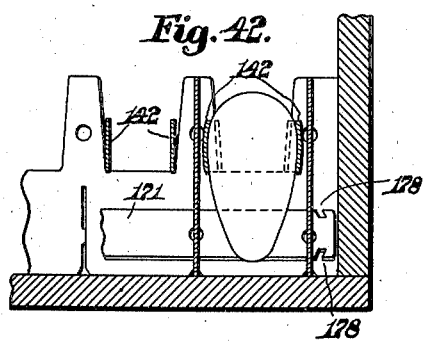
*Inventor:*
George W. Bowers,
by Walter E. Lombard, Atty.

UNITED STATES PATENT OFFICE.

GEORGE W. BOWERS, OF SOMERVILLE, MASSACHUSETTS, ASSIGNOR TO BROADFIELD POULTRY FARM, INC., OF BOLTON, MASSACHUSETTS, A CORPORATION OF MASSACHUSETTS.

MACHINE FOR MAKING FILLERS FOR EGG-CASES.

1,249,715.   Specification of Letters Patent.   Patented Dec. 11, 1917.

Application filed November 11, 1916. Serial No. 130,897.

*To all whom it may concern:*

Be it known that I, GEORGE W. BOWERS, a citizen of the United States of America, and a resident of Somerville, in the county of Middlesex and Commonwealth of Massachusetts, have invented certain new and useful Improvements in Machines for Making Fillers for Egg-Cases, of which the following is a specification.

This invention relates to machines for assembling trays for egg cases, and is particularly designed to automatically assemble the auxiliary strips extending across the usual pockets of a tray to complete the structure shown and described in an application of John B. Warren, filed May 26, 1916, and bearing the Serial Number 100,709.

Heretofore in the construction of trays or fillers of the character shown in the above mentioned application it has been necessary to insert the auxiliary strips by hand which entails a great amount of labor and consequently makes the trays so expensive as to make their use prohibitive.

The object of the present invention is to overcome this objection and produce a machine provided with a plurality of hoppers containing the auxiliary strips from which hoppers said strips may be fed automatically through slits in the walls of fillers placed upon a revoluble support and finally locked in adjusted position.

The invention consists in certain novel features of construction and arrangement of parts which will be fully understood by reference to the description of the drawings and to the claims hereinafter given.

For the purpose of illustrating the invention one preferred form thereof is illustrated in the drawings, this form having been found to give satisfactory and reliable results, although it is to be understood that the various instrumentalities of which the invention consists can be variously arranged and organized and that the invention is not limited to the precise arrangement and organization of these instrumentalities as herein shown and described.

Of the drawings:

Fig. 4 represents a vertical section showing in elevation the revoluble filler support and the vertically reciprocating frame carrying devices coacting with said support.

Fig. 5 represents a vertical section of the same on line 5—5 on Fig. 4.

Fig. 6 represents a sectional detail on lines 6—6 and 6$^x$—6$^x$ on Fig. 4, showing the stripper and the strip guide members coacting.

Fig. 7 represents an elevation of the lower part of the filler support and showing the means for removing the completed filler from the forms on the under face of said support.

Fig. 8 represents a horizontal section on line 8—8 on Fig. 7, and showing in plan the cam for actuating the filler support locking mechanism.

Fig. 15 represents a horizontal section of the front strip-containing-hopper and showing in plan the devices for discharging the strips therefrom.

Fig. 16 represents a rear elevation of the same with a portion thereof broken in section.

Fig. 17 represents a vertical section of the same on line 17—17 on Fig. 16.

Fig. 24 represents a plan showing one set of end needles for removing strips from the end hoppers and the means for actuating the same.

Fig. 25 represents a sectional detail on line 25—25 on Fig. 24.

Fig. 26 represents a side elevation of the operating end of one of the needles.

Fig. 27 represents a section of same on line 27—27 on Fig. 26 and looking toward the rear thereof.

Fig. 28 represents a plan of same.

Fig. 29 represents a section of same on line 29—29 on Fig. 28, looking toward the forward end thereof.

Fig. 30 represents a sectional detail on line 30—30 on Fig. 14, and showing the spring member coacting with the needles.

Fig. 31 represents a sectional detail of same, showing the opposite face of said spring member.

Fig. 32 represents a section on line 32—32 on Fig. 14.

Fig. 33 represents an elevation showing the mechanism for actuating each set of end needles.

Fig. 34 represents an elevation of the interrupted gears for imparting movement to the lever of said needle actuating mechanism.

Fig. 35 represents a sectional detail of said lever actuating devices.

Fig. 40 represents a plan of an egg case having therein a filler formed of two sets of partition walls, one set being disposed perpendicularly to the other set and through slots in which the machine herein described is adapted to feed auxiliary egg supporting strips.

Fig. 41 represents a sectional detail on line 41—41 on Fig. 40, and

Fig. 42 represents a sectional detail on line 42—42 on Fig. 40.

Figure 1:
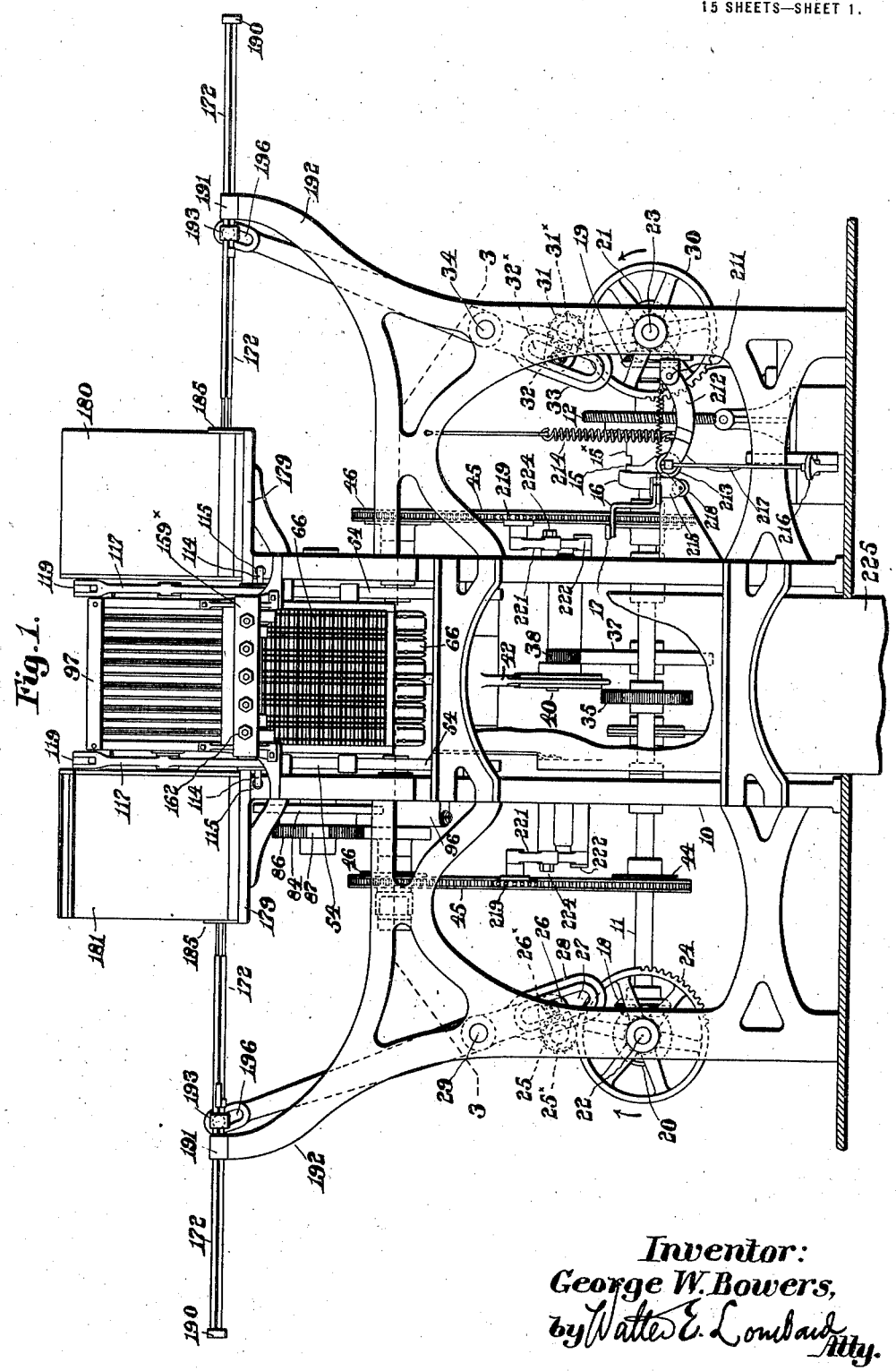
Figure 1 represents a front elevation of a machine embodying the principles of the present invention.
Figure 2:
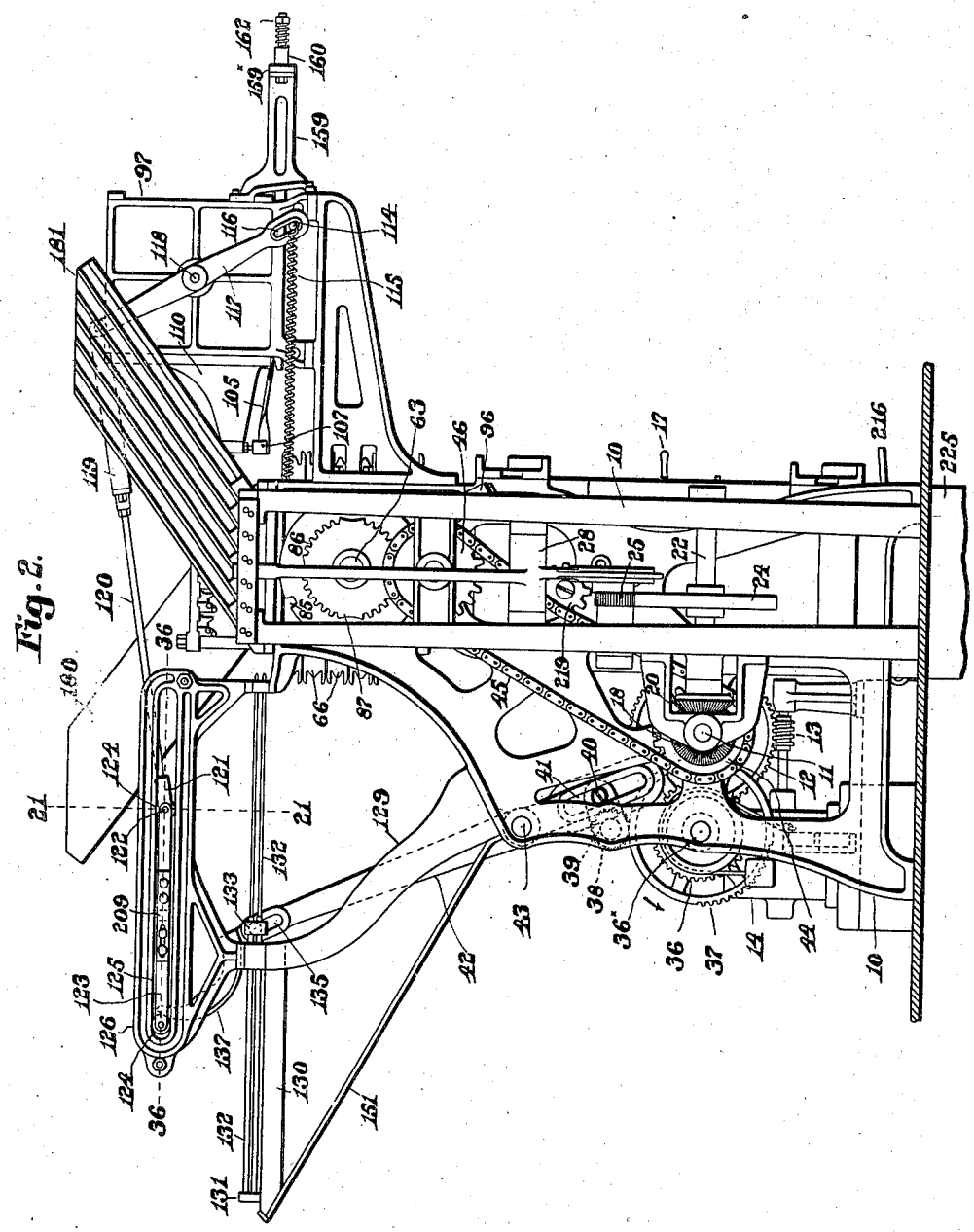
Fig. 2 represents a left end elevation of the same.
Figure 3:
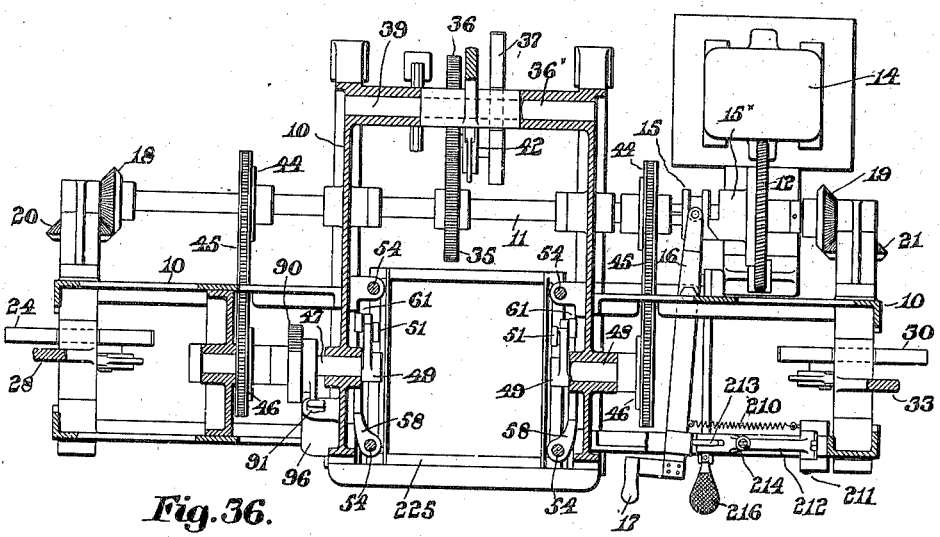
Fig. 3 represents a horizontal section on line 3—3 on Fig. 1.
Figures 36, 37, 38:
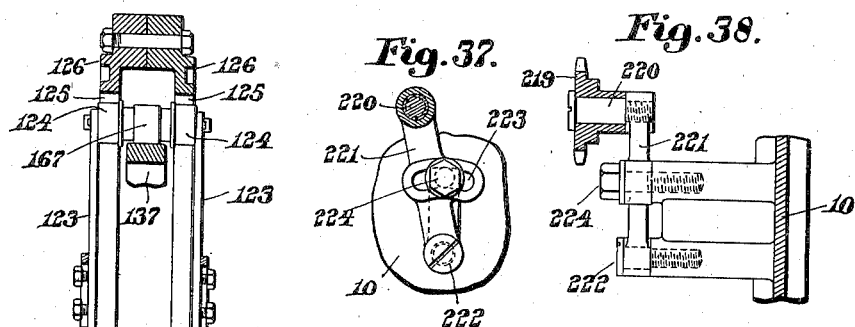
Fig. 36 represents a horizontal section on line 36—36 on Fig. 2.
Fig. 37 represents an elevation of the devices for taking up the slack in the driving chains.
Fig. 38 represents a side elevation of the same.
Figure 39:
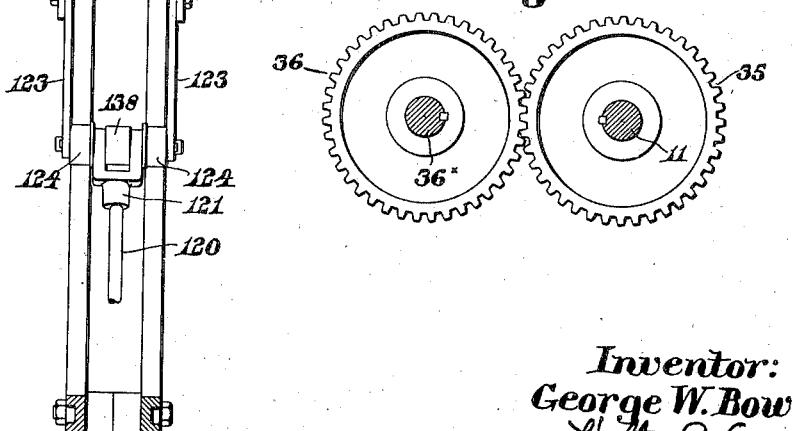
Fig. 39 represents a section of the driving shaft and the actuating shaft, showing in elevation the gears for transmitting rotary motion from the former to the latter.

Figs. 18, 33 to 36 inclusive, and 39 are drawn to an enlarged scale as compared with Figs. 1 to 3 inclusive, while Figs. 4, 5, 7 to 17 inclusive, 21 to 25 inclusive, 30, 31, 37 and 38 are drawn to a larger scale, and Figs. 6, 19, 20, 26 to 29 inclusive, and 32 are drawn to a still larger scale.

Similar characters designate like parts throughout the several figures of the drawings.

In the drawings, 10 is a frame having mounted therein the revoluble shaft 11 having loosely mounted thereon a worm gear 12 meshing with a worm 13 driven by a motor 14 which may be of any well-known construction. The shaft 11 has keyed thereto and slidably mounted thereon a clutch member 15 adapted to coact with another clutch member $15^x$ formed upon the hub of the worm gear 12. The clutch member 15 is moved longitudinally of the shaft 11 by means of the pivoted shipper lever 16 having an operating handle 17 at the outer end thereof. Near the opposite ends of the shaft 11 are secured bevel gears 18 and 19 meshing respectively with bevel gears 20 and 21 secured to the shafts 22 and 23. These shafts 22 and 23 are mounted in bearings in the frame 10 and are driven from the shaft 11 when rotary movement is imparted thereto.

The shaft 22 has secured thereto an interrupted gear 24 coacting with an interrupted pinion 25 secured to a shaft $25^x$ preferably positioned above the shaft 22 and parallel thereto. This shaft $25^x$ has secured thereto a crank 26 having a projection $26^x$ extending into a slot 27 formed in a lever 28 pivoted to the frame 10 at 29. The shaft 23 is similarly provided with an interrupted gear 30 coacting with an interrupted pinion 31 secured to a revoluble shaft $31^x$ having also secured thereto a crank 32 provided with a projection extending into a slot $32^x$ in a lever 33 pivoted at 34 to the frame 10. The shaft 11 has also secured thereto a gear 35 meshing with a gear 36 secured to a shaft $36^x$ revoluble in bearings in the frame 10. This shaft $36^x$ has secured thereto an interrupted gear 37 coacting with an interrupted pinion 38 secured to a shaft 39 revolubly mounted in bearings in the frame 10 above the shaft $36^x$. The shaft 39 has secured thereto a crank having a projection 40 extending into a slot 41 formed in a lever 42 pivoted at 43. The shaft 11 has also secured thereto two sprocket wheels 44 from which motion is imparted through the chains 45 to the sprocket wheels 46 secured to the shafts 47 and 48. The inner ends of these shafts 47 and 48 are each provided with a two-arm lever 49.

Figure 9:
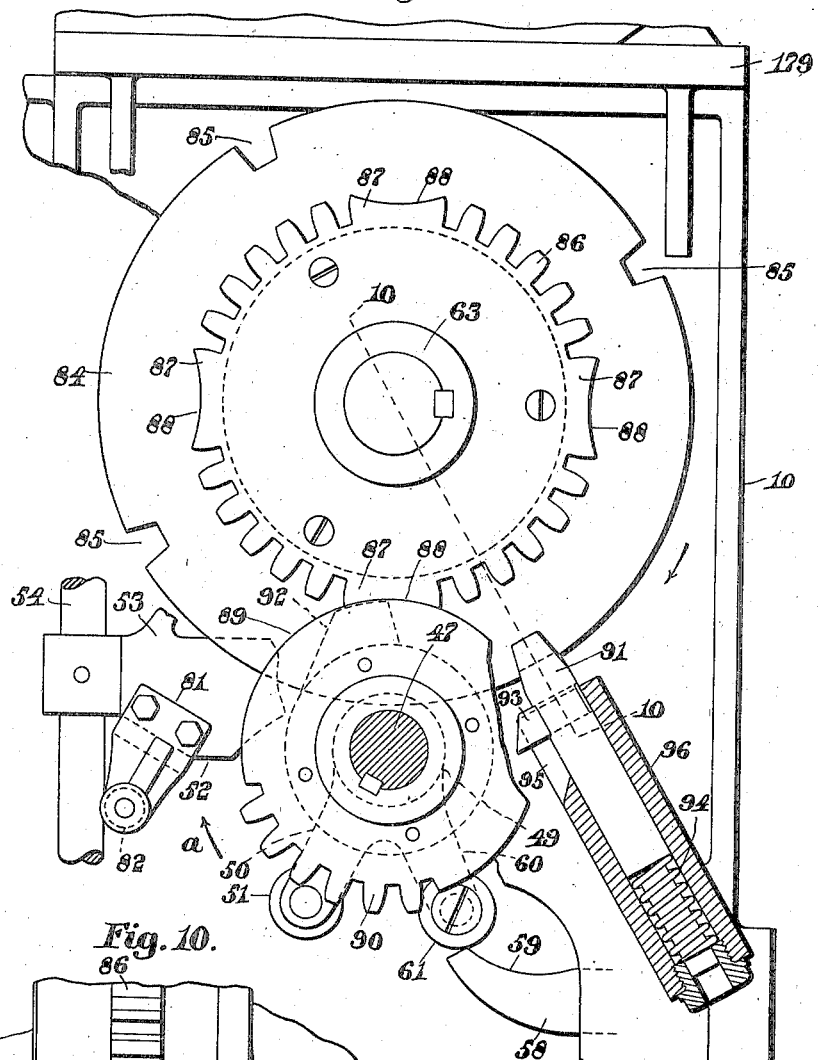
Fig. 9 represents an elevation of the mechanism for rotating the filler support and locking it in position while the strips are being inserted therein.
Figure 10:
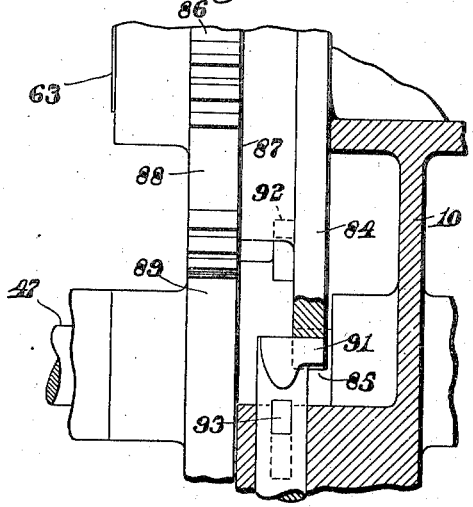
Fig. 10 represents a sectional detail on line 10—10 on Fig. 9.
Figure 11:
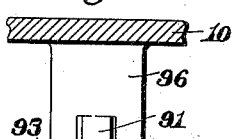
Fig. 11 represents a sectional detail showing in plan the locking device for said filler support.
Figure 12:
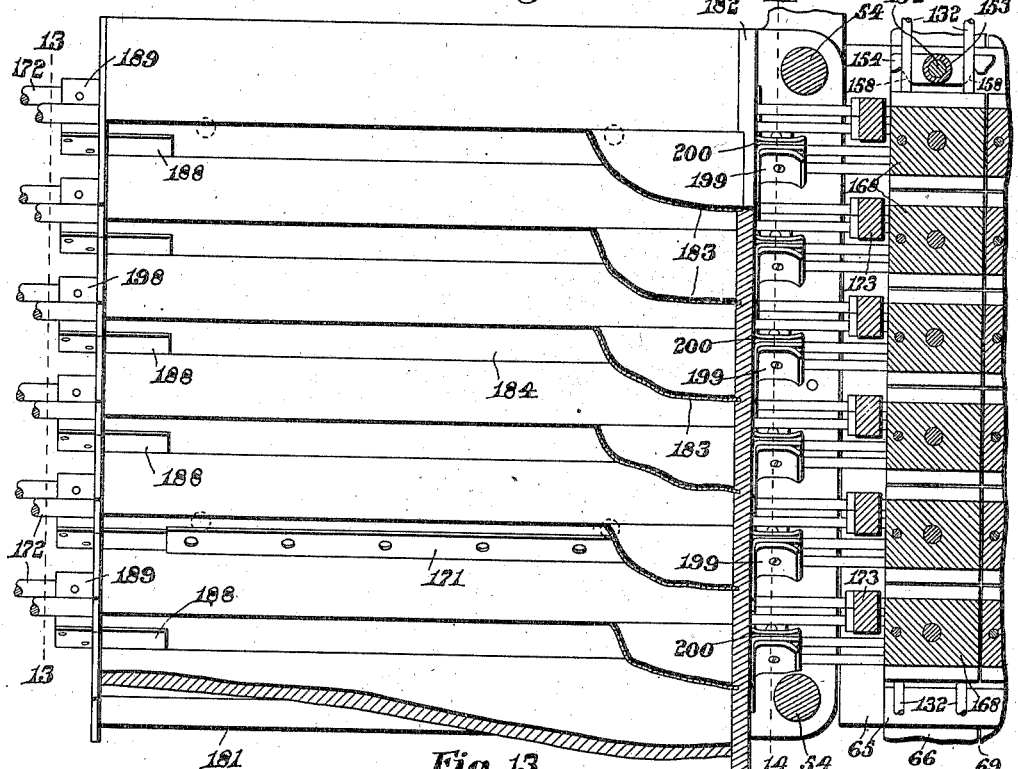
Fig. 12 represents a plan partially in section of one of the end strip-containing-hoppers and a portion of the filler support adjacent thereto.
Figure 13:
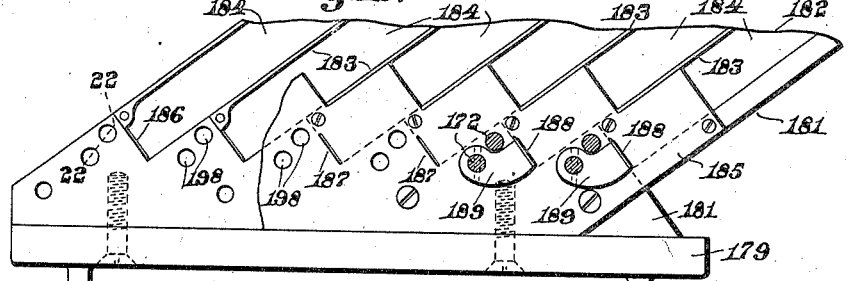
Fig. 13 represents a partial elevation of the left end of said hopper.
Figure 14:
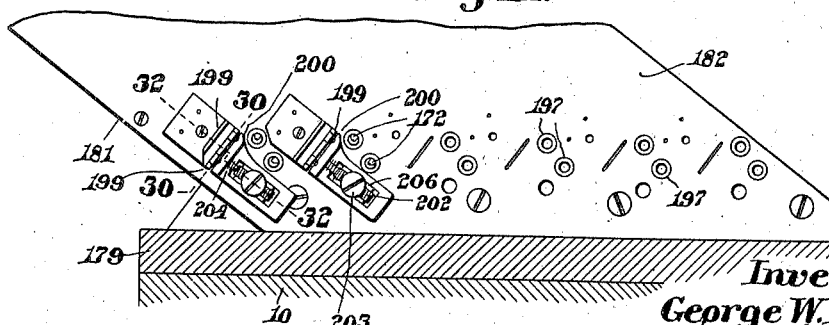
Fig. 14 represents a vertical section on line 14—14 on Fig. 12 showing in elevation the opposite end of said hopper.

One arm 50 of each lever 49 is provided with a roller 51 which in the rotation of the shafts 47 and 48 in the direction of the arrow *a* on Fig. 9 of the drawings is adapted to contact with the surface 52 of one of the cross bars 53, the opposite ends of which are secured to one set of vertical rods 54. The upper ends of both sets of vertical rods are tied together by a plate 55, thus forming a frame adapted to be vertically raised and lowered in bearings 56 secured to or forming a part of the frame 10. While the arm 50 is rotating in the direction of the arrow on Fig. 4 with the roller 51 in contact with the surface 52, it is obvious that the frame 53—54—55 will be raised until the roller 51 reaches the position shown in said figure.

As the arm 50 continues to move in the same direction, the roll 51 will move along the curved surface 57 and retain the said frame 53—54—55 in elevated position until it is again lowered by means to be described. One of each set of rods 54 has secured thereto an arm 58 having a cam surface 59 on the upper face thereof. The second arm 60 of each lever 49 has mounted thereon a roller 61 offset from the roller 51 and adapted in the rotation of the shafts 47 and 49 to come into contact with the cam face 59 of the arm 58 and positively lower the frame 53—54—55 to its normal position.

Between the two sets of rods 54 is mounted a flat-sided support or drum 62 mounted upon and revoluble with a shaft 63 revolubly mounted in bearings 64 in the frame 10. To each side of the drum or support 62 is secured a plate 65, to the outer face of which are secured a plurality of separated outwardly extending blocks 66, each of which is square in cross section.

Each row of blocks 66 is provided with a pair of alined slits 67 extending nearly to the base thereof, and each slit having formed therein a pair of needle receiving openings 68. These slits 67 are perpendicular to the axis of the shaft 63. The spaces 69 between the various blocks 66 are of sufficient width to receive the partition members of an egg case filler such as is shown in application filed May 26, 1916 by John B. Warren, the serial number of which is 100,709.

The outer ends of the blocks 66 are provided with transverse depressions 70 having an outer projection 71 centrally disposed therein, said projection having oppositely disposed inclined faces 72 which have at their opposite ends semi-cylindrical recesses 73. The depressions 70 in the various rows of blocks 66 are in alinement and parallel with the axis of the shaft 63.

At the opposite ends of the drum or support 62 are depressions 74 extending to the face of said drum or support. Each depression 74 is adapted to receive a stripper bar 75 normally held in position within said depression by means of a spring 76 and guided in its movements outwardly from said depression by means of a pair of parallel rods 77 secured to said stripper bar 75 and movable in bearings 78 secured to the inner wall of the drum or support 62. The opposite ends of the drum or support 62 are each provided with portions of a circular path 79 with which register other portions 80 of said circular path formed in the stripper bars 75.

Secured to each cross bar 53 are two depending brackets 81 provided at their lower ends with rollers 82 normally positioned within the paths 79. When in this position the drum or support 62 is free to rotate about the axis of the shaft 63. When the frame 53—54—55 is moved downwardly by the roller 61 contacting with the cam face 59 of the arm 58 the rolls 82 will move into the pockets 83 formed on a stripper bar 75 and move said stripper bar outwardly from the depression 54 against the tension of the spring 76 into the position shown in Fig. 7, thereby discharging the completed egg case filler from the blocks 66.

To the shaft 63 is secured a disk 84 provided with four peripheral notches 85 equidistant apart. To the outer face of the disk 85 is secured an interrupted gear 86 having four wide teeth 87 equidistant apart, the outer face of each of which is curved as at 88 to fit the curved periphery 89 of an interrupted gear 90 secured to and revoluble with the shaft 47. It is obvious that when the curved face 88 of a tooth 87 is in contact with the curved periphery 89 of the gear 90 no rotary movement will be imparted to the gear 86 and the shaft 63 carrying the drum or support 62. To further prevent the rotation of said drum or support 62 a spring pressed bolt 91 enters one of the peripheral notches 85 in the disk 84 and positively locks it from rotation until the cam member 92 secured to the inner face of the gear 90 comes into contact with the projection 93 on the bolt 91 and disengages it from a notch 85. This disengagement is timed to take place at the same time that the teeth in the gear 90 mesh with the narrower teeth of the gear 86. The rotation of the shaft 47 will then cause the drum or support 62 to be rotated through an angle of 90°. At the completion of this movement the curved surface 89 will coact with the curved surface 88 of another wide path 87 and simultaneously the bolt 91 will be forced by its spring 94 into another notch 85 of the disk 84. The projection 93 extends through a slot 95 in the housing 96 and prevents the bolt 91 from turning about its axis. The cam member 92 and the coacting projection 93 are so shaped as to permit the cam member 92 to pass said projection 93 as soon as the bolt 91 has been disengaged from a notch 85 and the disk 84 has commenced to rotate about the axis of the shaft 62.

At the front of the machine is a hopper 97 provided with a plurality of compartments 98 adapted to contain strips of proper width and thickness to be inserted through slits in the partition walls of an egg case filler such as is shown and described in the application of John B. Warren, hereinbefore referred to.

Beneath the compartments 98 is a slidable bottom 99 adapted to be reciprocated on revoluble supports 100, as shown in Figs. 16 and 17 of the drawings. This bottom 99 has secured to its upper face a plurality of pushers 101 projecting into the compartments 98, the width and thickness of each pusher corresponding to the width and thickness of the strips contained within said compartments. The lower edge of the rear wall 102 of the hopper 97 is separated from the upper face of the bottom 99 a distance slightly in excess of the thickness of the strips in the compartments 98.

The rear portion of the upper face of the bottom 99 is provided with a plurality of grooves 103 as shown in Figs. 15, 16, and 17. Into each groove 103 beneath the lower edge of the wall 102 projects an extension 104 of a flat-sided tubular member 105 which is twisted so that the front portion thereof is horizontal and the rear portion thereof is vertical, as shown in Fig. 17. The front portion of said twisted tubular member 105 is secured to the wall 102 by the screw 106, while the rear end is positioned in the bifurcated member 107 having a threaded shank 108 extending through a slotted bar 109 supported from the wall 102 by the ribs 110.

By loosening the nuts 111 and 112 on the threaded shank 108, the bifurcated member 107 with the rear end of the tubular member 105 therein may be adjusted vertically as desired, and also longitudinally of the slot in the bar 109 and then again clamped in adjusted position. From the under face of the bottom 99 project ears 113 having a rod 114 extending therethrough. To each outer end of the rod 114 is secured one end of a spring 115, the opposite end of which is secured to the frame 10 as indicated in Fig. 2 of the drawings. The opposite ends of the rods 114 extend through slots 116 in levers 117 pivoted at 118 to the outer walls of the hopper 97. The opposite ends of the lever 117 have pivoted thereto a U-shaped member 119 to which is secured a rod 120, the opposite end of which is secured to a member 121, pivotally connected at 122 to a movable frame 123 having rollers 124 movable in a slot 125 formed in the bars 126 supported by brackets 127 secured to a cross bar 128 mounted upon arms 129 extending rearwardly from the frame 10. To the upper ends of the arms 128 are secured the horizontal rearwardly extending tracks 130 on which the needle plate 131 is adapted to reciprocate.

Figure 18:
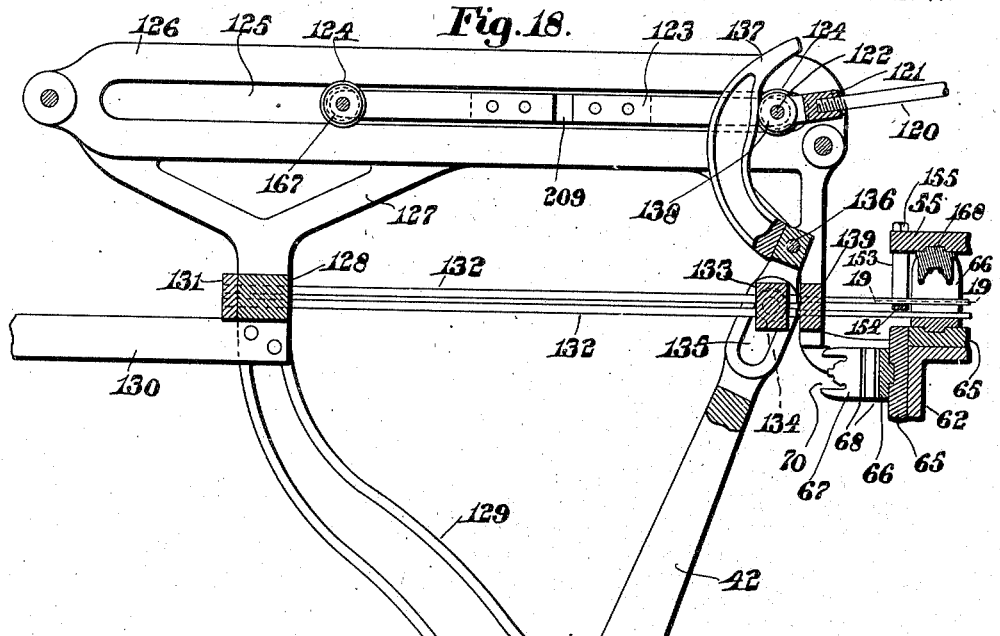
Fig. 18 represents an elevation, partly in section, of the mechanism for operating the devices for delivering the strips from the forward hopper.
Figure 19:
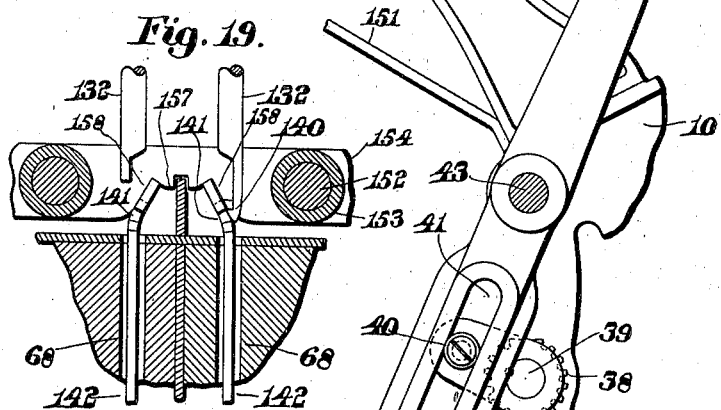
Fig. 19 represents a horizontal sectional detail on line 19—19 on Fig. 18 and drawn to an enlarged scale.
Figure 21:
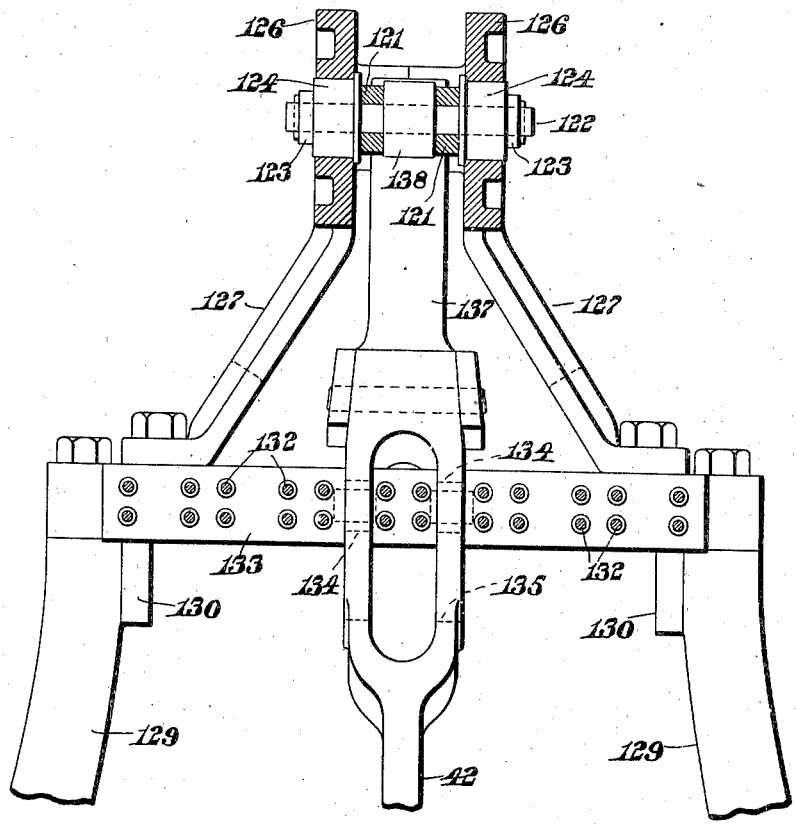
Fig. 21 represents a vertical section on line 21—21 on Fig. 2.
Figure 22:
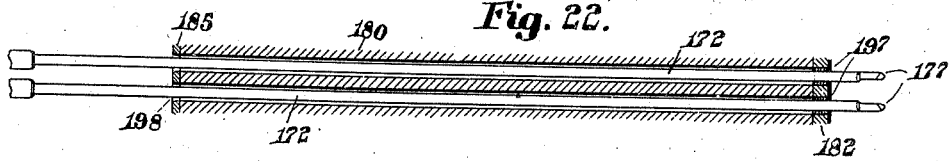
Fig. 22 represents a sectional detail on line 22—22 on Fig. 13, showing the needles in retracted position.
Figure 23:
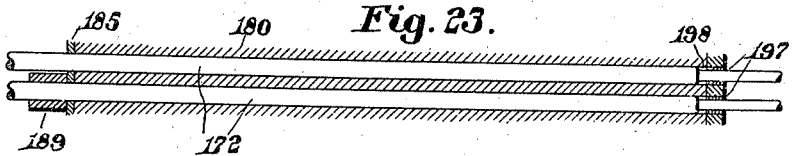
Fig. 23 represents a similar view showing the needles in their forward position.

This plate 131 has secured therein the rear ends of a plurality of needles 132 disposed therein in pairs, as indicated in Figs. 18 and 21 of the drawings. The intermediate portions of the two central pairs of needles 132 are mounted in the block 133 having rollers 134 at its opposite ends, said rollers extending through the slots 135 in the slotted end of the lever 42. Secured at 136 to the upper end of the lever 42 is a cam finger 137, the cam surface of which coacts with a roll 138 revolubly mounted upon the pivot 122.

The needles 132 extend through openings in a guide bar 139 secured to the rear of the frame 10. The forward ends of each pair of needles are provided with hooked projections 140 adapted to engage with notches 141 in the opposite edges of the strips 142 when pushed from the bottoms of the compartments 98 by the shouldered pushers 101 secured to the reciprocating bottom 99.

Figure 20:
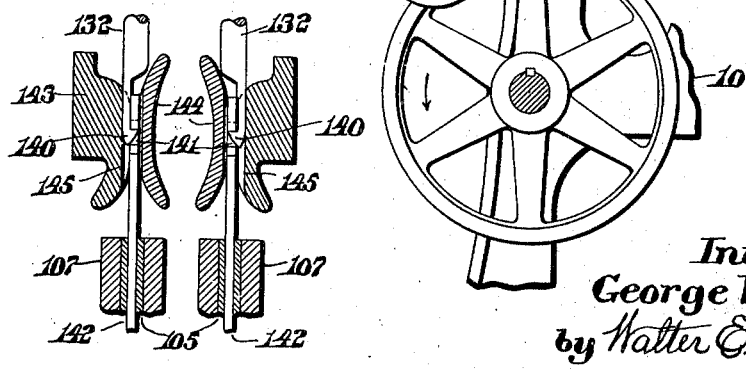
Fig. 20 represents a horizontal sectional detail on line 20—20 on Fig. 17.

The bottom plate 99 is moved toward the rear of the machine by the lever 42 and the cam projection 137 thereon acting against the roller 138 at the rear end of the connecting rod 120. This connecting rod 120 operates the pivoted lever 117 to effect a rearward movement of said bottom plate 99 so that the pushers 101 thereon may engage the lower strips in the compartments 98 and move them rearwardly beneath the wall 102 into the tubular members 105. As the rear ends of the strips 142 pass outwardly from the tubular member 105 they enter between a fixed jaw 143 and a spring pressed jaw 144, as shown in Fig. 20 of the drawings. The fixed jaw 143 is provided with a semicylindrical groove 145 into which the forward end of the needles 132 enter. The tension of the spring jaw 144 is such as to force the rear end of the strip 142 into locking engagement with the hooks 140 of the needles 132, these needles entering the notches 141 in the upper and lower edges of the strips, as indicated in Figs. 17 and 20 of the drawings.

The fixed jaw 143 is secured to a bracket 146 secured to a plate 147 superimposed upon the plate 55. Each spring jaw 144 is pivoted at 148 to the bracket 146. Each fixed jaw has projecting laterally therefrom a headed member 149 extending through a slot in the spring jaw 144, having a spring 150 surrounding the shank thereof. The tension of this spring 150 is to retain the jaws 143—144 in coacting relation to each other.

The tension of the spring 150 is sufficient to force the hooks 140 of the needles 132 into the notches 141 of the strips 142. After the hooks 140 have been engaged in the notches of the springs 142 the movement of the lever 42 to the rear of the machine will draw the strips through the slits 67 of the blocks 66, and in doing so these strips will be passed through slits in the partition walls of the egg case filler shown and described in the aforesaid Warren application.

When the lever 42 is moved to the rear of the machine the needle bar 131 will move along the rails 130, the rear ends of which are supported by the brace 151. Depending from the rear end of the plate 55 are a plurality of threaded members 152 surrounded by the sleeves 153 interposed between the under face of the plate 150 and a bar 154 secured to the lower ends of the threaded members 152. These threaded members 152 are locked in position by means of the nuts 155 bearing against the upper face of the plate 55. The bar 154 is provided with a plurality of notches 157 having inclined faces 158 against which the rear ends of the strips 142 come into contact in their rearward movement and are bent into the position shown in Fig. 19 of the drawings. This bending of the protruding ends of the strips 142 disengages them from the hooked ends of the needles 132 so that said needles may continue their rearward movement and leave the strips properly positioned in the partition walls of the egg case filler.

To the front of the hopper 97 is secured a rectangular frame 159 surrounding and in the same plane with the reciprocating bottom 99. The front bar of said frame 159× is provided with plurality of hubs 160 in each of which is mounted a buffer 161, the outer ends of which are threaded and provided with nuts 162 thereon. Between these nuts 162 and the front ends of the hubs 160 are interposed springs 163. Each buffer member 161 is provided with a head 164 at its inner end between which and the bar 159× is a spring 165 having greater tension than the spring 163. Inserted in the inner end of each buffer member 161 is a plug 166 of felt or some similar fibrous material. When the bottom 99 is moved toward the front of the machine by means of the lever 42 striking against a roller 167 at the rear of the slidable frame 123 in its forward movement, said bottom 99 will strike against the buffers 161 and the springs 165 will yield sufficiently to prevent any shock as the bottom 99 is gradually brought to a stop.

When further forward movement of the bottom 99 is prevented, the lighter springs 163 will return the buffer members 161 to their normal positions as indicated in Fig. 15 of the drawings. The normal position of the lever 42 is the position indicated in Fig. 2 of the drawings, and while in this position the spring 115 retains the roller 167 in contact with the rear face of the cam finger 137. As this finger 137 moves toward the front of the machine, the spring 115 will cause the roller to follow said finger in contact therewith until the front face of said cam finger 137 comes into contact with the roller 132 when a positive movement is imparted through the connecting rod 120 to the lever 117 and positively moves the bottom 99 toward the rear of the machine.

To the under face of the plate 55 are secured a plurality of depending blocks 168, the lower ends of which are provided with oppositely inclined faces 169 with a semi-cylindrical needle receiving groove 170 at each end of said inclined faces. When the plate 55 is moved downwardly the lower portions of these blocks 168 enter the transverse depressions 70 of the blocks 66 with the inclined faces 169 separated sufficiently from the inclined faces 72 of said blocks 66 to admit the strips 171, the semi-cylindrical grooves 170 coacting with the semi-cylindrical grooves 73 in the blocks 66 to form passages for the side needles 172. It is obvious from an inspection of the drawings that the needles 172 are in pairs, each pair being inclined in the opposite direction.

At one end of each depending block 168 is a guide member 173 provided with bell-mouthed needle positioning openings 174 for all of the pairs of needles inclined in one direction. At the opposite ends of the rows of blocks 168 are similar needle positioning members 173 for the various pairs of needles inclined in the opposite direction. When the side needles 172 move toward each other the forward ends enter the bell-mouthed openings 174 and pass through the needle receiving openings formed by the grooves 73 and 170. When the needles 172 have seized the strips 171 and have drawn them on the return movement of said needles through the spaces between the inclined faces 72 and 169 and also through the inclined slits in the egg case filler, the protruding ends 175 will come into contact with the curved faces 176 of the members 173, and said protruding ends 175 will be bent sidewise as indicated in Fig. 6 of the drawings, so that the hook 177 of the needles 172 will become disengaged from the notches 178 formed in the opposite edges of said strips 171.

When the hooks 177 have been thus disengaged from the notches 178 the strips 171 will be properly positioned in the egg case filler and the needles 172 are free to return to their normal positions. Secured to the frame 10 are side shelves 179 on which are supported oppositely inclined hoppers 180 and 181. Each hopper 180—181 is composed of a vertical inner plate 182 and a plurality of inclined plates 183 forming a plurality of inclined compartments 184. The outer ends of the hoppers 180—181 have secured thereto a metal plate 185 extending upwardly above the lower portions of the compartment 184 and the upper portions of the compartments are left open at their upper ends to facilitate the filling of the compartments with strips when desired.

Each plate 182 is provided with a plurality of strip discharging slits 186 at the bottoms of the compartments 184. Alined with these slits 186 are other slits 187 formed in the outer plate 185. These slits 187 are adapted to receive the pushers 188, each secured to a curved support 189 riveted to the lower of each pair of needles 172. The outer ends of the needles 172 are secured to a bar 190 and pass through grooves in the guide bars 191 secured to arms 192 forming a part of the frame 10. The needles 172 are also secured to a pair of alined bars 193 having trunnions 194 extending toward each other. Said trunnions 194 have mounted thereon a roller 195 extending through a slot 196 in one of the levers 28 or 33.

When during the operation of the machine the levers 28 and 33 are moved about their respective pivots 29 and 34 the various pairs of needles 172 are moved toward each other, the pairs of needles on one side of the machine being alternately disposed relatively to the pairs of needles at the opposite side of said machine. The inner ends of the needles 172 are guided in bushings 197 in the plates 182. These bushings 197 and the guide bars 191 retain the needles 172 always in parallelism so that when the levers 28 and 33 are moved about their pivots to move the needles toward the center of the machine the pushers 188 will enter the slits 187 in the plate 175 and their forward ends will engage with the lower strip 171 in each compartment 183 and move said strips through the slits 186.

The plate 185 is also provided with openings 198 for positioning the needles 172 as they move inwardly toward each other. The strips 171 are pushed through the slits 186 and the protruding ends thereof enter between the fixed plate 199 and the spring pressed plate 200. This spring pressed plate 200 is provided with a shank 201, the end of which is positioned in a guide member 202 threaded to a support 203 mounted on the plate 182. Between the end of the guide member 202 and the spring pressed plate 200 is a spring 204, the tension of which may be adjusted by turning the threaded guide member 202. The base of the spring pressed member 200 is provided with a slot 205 into which fits a rectangular plate 206 surrounding the shank 207 of the support 203 and prevented from turning about the axis of said shank by means of the pin 208.

When the needles 172 reach the extreme inner end of their movements they enter between the plate 199 and a spring pressed plate 200 and the hooks 177 thereof are engaged with the notches 178 of the strips 171. On the return movement of the needles 172 toward the outer ends of the machine, the strips 171 are withdrawn from the hoppers 180 and 181 and positioned within the slits of the partition walls of the egg case filler, after which said strips are disengaged from the hooks 177 of the needles 172 by means of the castoff members 173.

The frame 123 is made in two sections connected by a pair of slotted bars 209 whereby the distance between the rollers 138 and 167 may be adjusted as desired.

The lever 16 has secured thereto near its outer end one end of a spring 210, the opposite end of which is secured to the frame 10. The tendency of this spring is to move the lever 16 quickly about its pivot to cause the slidable part 15 of the clutch to be disengaged from the other part 15$^x$ of said clutch and thus cause the machine to be stopped.

Pivoted at 211 is a member 212 having at its free end a roller 213 which normally is retained by a spring 214 in the path of the lever 16 when the machine is in operation, said roller coacting with a block 215 depending from said lever 16. When in this position the clutch members 15—15$^x$ are retained in engagement until the operator desires to stop the machine, in which case the treadle 216 is depressed, which downward movement will cause the member 212 to be moved from the path of the lever 16 and the block 215, said treadle 216 being connected to the pivoted member 212 by a link 217.

When the member 212 is moved downwardly about its pivot 211, the spring 210 will act to quickly move the lever 16 about its pivot and disengage the clutch members 15—15$^x$, the roller 218 in the bottom of the block 215 riding over the roller 213.

The sprocket chains 45 are kept taut by means of the sprocket wheels 219 revolubly mounted on studs 220 in the ends of members 221 pivoted to the frame 10 at 222 and provided with slots 223 through which extend clamping members 224 by which said members 221 may be retained in adjusted position.

When the various strips have been positioned in the slits in the egg case filler, the said filler will be removed from its support and drop down the chute 225 into a suitable receptacle beneath the floor.

In Figs. 40 to 42 inclusive is shown an egg case with a filler therein, the partition walls of which are provided with a plurality of slits and slots in which the auxiliary strips 142—171 are adapted to be positioned by means of the machine herein shown and described.

It is believed to be unnecessary to describe said filler in detail in this application, the complete description of the same being obtainable by reference to the specification forming part of the Warren application hereinbefore referred to.

It is believed that the operation and many advantages of this invention will be fully understood from the foregoing description.

Having thus described my invention, I claim:

1. In a machine of the class described, the combination of a support adapted to carry an egg case filler; a plurality of compartments containing strips; and means for withdrawing a strip from each compartment and positioning it in slits in the walls of said filler.

2. In a machine of the class described, the combination of a support adapted to carry an egg case filler; a plurality of compartments containing strips; and a needle for withdrawing a strip from each compartment and positioning it in slits in the walls of said filler.

3. In a machine of the class described, the combination of a support adapted to carry an egg case filler; a plurality of compartments at the front and side of said support and containing strips; and means for withdrawing a strip from each compartment and positioning it in slits in the walls of said filler.

4. In a machine of the class described, the combination of a support adapted to carry an egg case filler; a plurality of compartments at the front and side of said support and containing strips; and a needle for withdrawing a strip from each compartment and positioning it in slits in the walls of said filler.

5. In a machine of the class described, the combination of a support adapted to carry an egg case filler; a plurality of compartments at the front and each side of said support and containing strips; and means for withdrawing a strip from each compartment and positioning it in slits in the walls of said filler.

6. In a machine of the class described, the combination of a support adapted to carry an egg case filler; a plurality of compartments at the front and each side of said support and containing strips, said side compartments being inclined in opposite direction; and means for withdrawing a strip from each compartment and positioning it in slits in the walls of said filler.

7. In a machine of the class described, the combination of a support adapted to carry an egg case filler; means for intermittently rotating said support; a plurality of compartments containing strips; and means for withdrawing a strip from each compartment and positioning it in slits in the walls of said filler while said support is at a standstill.

8. In a machine of the class described, the combination of a support adapted to carry an egg case filler; a plurality of compartments containing strips; means for withdrawing a strip from each compartment and positioning it in slits in the walls of said filler; and means for twisting said strip as withdrawn from said compartment.

9. In a machine of the class described, the combination of a flat-sided member; a plurality of separated blocks secured to a face thereof adapted to receive and position an egg case filler and each block being provided with two parallel strip-receiving-slits; a plurality of compartments containing strips; and means for withdrawing strips from said compartments through said slits and positioning them in slits in the walls of said filler.

10. In a machine of the class described, the combination of a flat-sided member; a plurality of separated blocks secured to a face thereof adapted to receive and position an egg case filler having a plurality of parallel slits in opposed walls thereof and each block having a pair of parallel slits in alinement with slits in the walls of said filler; a plurality of compartments containing strips; and means for withdrawing strips from said compartments and positioning them in the slits in said blocks and the walls of said filler.

11. In a machine of the class described, the combination of a flat-sided member; a plurality of separated blocks secured to a face thereof adapted to receive and position an egg case filler having a plurality of parallel slits in opposed walls thereof and each block having a pair of parallel slits in alinement with slits in the walls of said filler; a plurality of compartments containing strips; means for withdrawing strips from said compartments and positioning them in the slits in said blocks and the walls of said filler; and means for subsequently, in the rotation of said supporting member, removing said fillers from said blocks.

12. In a machine of the class described, the combination of a revoluble flat-sided member; means for intermittently rotating said member; a plurality of separated blocks secured to a face thereof adapted to receive and position an egg case filler having a plurality of parallel slits in opposed walls thereof and each block having a pair of parallel slits in alinement with slits in the walls of said filler; a plurality of compartments containing strips; means for withdrawing strips from said compartments and positioning them in the slits in said blocks and the walls of said filler; and cam-controlled mechanism for subsequently, in the rotation of said supporting member, removing said filler from said blocks.

13. In a machine of the class described, the combination of a flat-sided member; separated blocks secured thereto having parallel slits therein provided with enlarged needle receiving openings: compartments containing strips; and needles movable through said openings and adapted to remove strips from said compartments and position them in said slits and slits in the walls of an egg case filler positioned on said blocks.

14. In a machine of the class described, the combination of a flat-sided member; separated blocks secured thereto having parallel slits therein provided with enlarged needle receiving openings; compartments containing strips horizontally disposed therein; means for removing selected strips from said compartments; and needles movable through said openings and adapted to seize said strips and position them in said slits and slits in the walls of an egg case filler positioned on said blocks.

15. In a machine of the class described, the combination of a flat-sided member; separated blocks secured thereto having parallel slits therein provided with enlarged needle receiving openings; compartments containing strips horizontally disposed therein; means for removing selected strips from said compartments; needles movable through said openings and adapted to remove strips from said compartments and position them in said slits and slits in the walls of an egg case filler positioned on said blocks; and means for subsequently disengaging said needles from said strips.

16. In a machine of the class described, the combination of a revoluble flat-sided member; means for intermittently rotating said member; separated blocks secured thereto having parallel slits therein provided with enlarged needle receiving openings; compartments containing strips horizontally disposed therein; means for removing selected strips from said compartments; needles movable through said openings and adapted to remove strips from said compartments and position them in said slits and slits in the walls of an egg case filler positioned on said blocks; means for subsequently disengaging said needles from said strips; and mechanism for removing said fillers from said blocks.

17. In a machine of the class described, the combination of a flat-sided member; separated blocks secured thereto having parallel slits therein provided with enlarged needle receiving openings; compartments containing strips horizontally disposed; means for removing selected strips from said compartments; means for twisting said strips in their movements from said compartments to cause the forward ends thereof to assume a vertical position; and needles movable through said openings and adapted to remove strips from said compartments and position them in said slits and slits in the walls of an egg case filler positioned on said blocks.

18. In a machine of the class described, the combination of a revoluble flat-sided member; means for intermittently rotating said member; separated blocks secured thereto having parallel slits therein provided with enlarged needle receiving openings; compartments containing strips horizontally disposed therein; means for removing selected strips from said compartments; guide members for twisting said strips in their movement from said compartments to cause the forward ends thereof to assume a vertical position; and needles movable through said openings and adapted to remove strips from said compartments and position them in said slits and slits in the walls of an egg cast filler positioned on said blocks.

19. In a machine of the class described, the combination of a flat-sided member; separated blocks secured thereto having parallel slits therein provided with enlarged needle receiving openings; compartments containing strips; needles movable through said openings and adapted to remove strips from said compartments and position them in said slits and slits in the walls of an egg case filler positioned on said blocks; and means for positioning the operating ends of said needles when engaging said strips.

20. In a machine of the class described, the combination of a revoluble flat-sided member; means for intermittently rotating said member; separated blocks secured thereto having parallel slits therein provided with enlarged needle receiving openings; compartments containing strips; needles movable through said openings and adapted to remove strips from said compartments and position them in said slits and slits in the walls of an egg case filler positioned on said blocks; and yielding means for positioning the operating ends of said needles when engaging said strips.

21. In a machine of the class described, the combination of a flat-sided member; separated blocks secured thereto having parallel slits therein provided with enlarged needle receiving openings; compartments containing strips; a reciprocating member; a shouldered member thereon adapted to engage the lower strip in each compartment and remove it therefrom into position to be seized by needles; and needles movable through said openings and adapted to remove strips from said compartments and position them in said slits in the walls of an egg case filler positioned on said blocks.

22. In a machine of the class described, the combination of a revoluble flat-sided member; means for intermittently rotating said member; separated blocks secured thereto having parallel slits therein provided with enlarged needle receiving openings; compartments containing strips; a reciprocating member; a shouldered member thereon adapted to engage the lower strip in each compartment and remove it therefrom into position to be seized by needles; needles movable through said openings and adapted to remove strips from said compartments and position them in said slits and slits in the walls of an egg case filler positioned on said blocks; and means for holding the end of said strip while being seized by said needles.

23. In a machine of the class described, the combination of a flat-sided member; separated blocks secured thereto having parallel slits therein provided with enlarged needle receiving openings; compartments containing strips; and needles movable through said openings and adapted to remove strips from said compartments and position them in said slits and slits in the walls of an egg case filler positioned on said blocks, said needles being provided with hooked ends adapted to engage notches in the ends of said strips.

24. In a machine of the class described, the combination of a revoluble flat-sided member; means for intermittently rotating said member; separated blocks secured thereto having parallel slits therein provided with enlarged needle receiving openings; compartments containing strips; needles movable through said openings adapted to seize strips from said compartments and position them in the slits in said blocks and in slits in the walls of an egg case filler positioned on said blocks; a reciprocating member provided with means for removing the under strips from said compartments, the upper face of said reciprocating member being provided with grooves alined with said compartments; a guide for each strip; and a tongue thereon with its free end in a groove.

25. In a machine of the class described, the combination of a flat-sided member; separated blocks secured thereto having parallel slits therein provided with enlarged needle receiving openings; compartments containing strips; needles movable through said openings adapted to seize strips from said compartments and position them in the slits in said blocks and in slits in the walls of an egg case filler positioned on said blocks; a reciprocating member provided with means for removing the under strips from said compartments, the upper face of said reciprocating member being provided with grooves alined with said compartments; a twisted guide for each strip; and a horizontal tongue thereon with its free end in a groove.

26. In a machine of the class described, the combination of a revoluble flat-sided member; means for intermittently rotating said member; separated blocks secured thereto having parallel slits therein provided with enlarged needle receiving openings; compartments containing strips; needles movable through said openings adapted to seize strips from said compartments and position them in the slits in said blocks and in slits in the walls of an egg case filler positioned in said blocks; a reciprocating member provided with means for removing the under strips from said compartments, the upper face of said reciprocating member being provided with grooves alined with said compartments; a guide for each strip; a tongue thereon with its free end in a groove; and means providing for vertical adjustment of the free end of said guide.

27. In a machine of the class described, the combination of a revoluble flat-sided member; means for intermittently rotating said member; separated blocks secured thereto having parallel slits therein provided with enlarged needle receiving openings; compartments containing strips; needles movable through said openings adapted to seize strips from said compartments and position them in the slits in said blades and in slits in the walls of an egg case filler positioned on said blocks; a reciprocating member provided with means for removing the under strips from said compartments, the upper face of said reciprocating member being provided with grooves alined with said compartments; a guide for each strip; a tongue thereon with its free end in a groove; a forked member to which the free end of said guide is secured; a threaded shank therefor extending through a fixed bar; and nuts on said threaded shank co-acting with said bar.

28. In a machine of the class described, the combination of a member; separated blocks secured thereto having parallel slits therein provided with enlarged needle receiving openings; compartments containing strips; needles movable through said openings adapted to seize strips from said compartments and position them in the slits in said blocks and in slits in the walls of an egg case filler positioned on said blocks; a pivoted lever for moving said needles endwise; mechanism for removing the under strips in said compartments and positioning them where they may be seized by said needles; and means for operating said strip removing mechanism actuated by said needle moving lever.

29. In a machine of the class described, the combination of a revoluble member; means for intermittently rotating said member; separated blocks secured thereto having parallel slits therein provided with enlarged needle receiving openings; compartments containing strips; needles movable through said openings adapted to seize strips from said compartments and position them in the slits in said blocks and in slits in the walls of an egg case filler positioned on said blocks; a pivoted lever for moving said needles endwise; mechanism for removing the under strips in said compartments and positioning them where they may be seized by said needles; and means for operating said strip removing mechanism actuated by said needle moving lever during a portion of the movement of said lever.

30. In a machine of the class described, the combination of a member; separated blocks secured thereto having parallel slits therein provided with enlarged needle receiving openings; compartments containing strips; needles movable through said openings adapted to seize strips from said compartments and position them in the slits in said blocks and in slits in the walls of an egg case filler positioned on said blocks; a pivoted lever for moving said needles endwise; a slidable member provided with means for removing the under strips from said compartments; an oscillating lever to move said slidable member in one direction; a spring to move it in the opposite direction; and means actuated by said needle-moving-lever for moving said oscillating lever about its pivot.

31. In a machine of the class described, the combination of a revoluble member; means for intermittently rotating said member; separated blocks secured thereto having parallel slits therein provided with enlarged needle receiving openings; compartments containing strips; needles movable through said openings adapted to seize strips from said compartments and position them in the slits in said blocks and in slits in the walls of an egg case filler positioned on said blocks; a pivoted lever for moving said needle endwise; a slidable member provided with means for removing the under strips from said compartments; an oscillating lever to move said slidable member in one direction; a spring to move it in the opposite direction; a sliding frame provided with separated projections; a connector between said oscillating lever and frame; and an arm on said needle moving lever adapted to engage one of said projections during its movement in each direction.

32. In a machine of the class described, the combination of a member; separated blocks secured thereto having parallel slits therein provided with enlarged needle receiving openings; compartments containing strips; needles movable through said openings adapted to seize strips from said compartments and position them in the slits in said blocks and in slits in the walls of an egg case filler positioned on said blocks; a pivoted lever for moving said needles endwise; a slidable member provided with means for removing the under strips from said compartments; an oscillating lever to move said slidable member in one direction; a spring to move it in the opposite direction; a sliding frame provided with separated projections; a connector between said oscillating lever and frame; and a cam-shaped arm on said needle moving lever adapted to engage one of said projections during its movement in each direction.

33. In a machine of the class described, the combination of a member; separated blocks secured thereto having parallel slits therein provided with enlarged needle receiving openings; compartments containing strips; needles movable through said openings adapted to seize strips from said compartments and position them in the slits in said blocks and in slits in the walls of an egg case filler positioned on said blocks; a pivoted lever for moving said needles endwise; a slidable member provided with means for removing the under strips from said compartments; an oscillating lever to move said slidable member in one direction; a spring to move it in the opposite direction; means actuated by said needle-moving-lever for moving said oscillating lever about its pivot; and resilient means for retarding the return movement of said slidable member.

34. In a machine of the class described, the combination of a member; separated blocks secured thereto having parallel slits therein provided with enlarged needle receiving openings; compartments containing strips; needles movable through said openings adapted to seize strips from said compartments and position them in the slits in said blocks and in slits in the walls of an egg case filler positioned on said blocks; a pivoted lever for moving said needles endwise; a slidable member provided with means for removing the under strips from said compartments; an oscillating lever to move said slidable member in one direction; a spring to move it in the opposite direction; means actuated by said needle-moving-lever for moving said oscillating lever about its pivot; and a plurality of spring pressed plungers for retarding the return movement of said slidable member.

35. In a machine of the class described, the combination of a revoluble member; means for intermittently rotating said member; separated blocks secured thereto having parallel slits therein provided with enlarged needle receiving openings; compartments containing strips; needles movable through said openings adapted to seize strips from said compartments and position them in the slits in said blocks and in slits in the walls of an egg case filler positioned on said blocks; a pivoted lever for moving said needles endwise; a slidable member provided with means for removing the under strips from said compartments; an oscillating lever to move said slidable member in one direction; a spring to move it in the opposite direction; means actuated by said needle-moving-lever for moving said oscillating lever about its pivot; a plurality of spring pressed plungers for retarding the return movement of said slidable member; and auxiliary springs surrounding said plungers for taking up the shock upon the return of said plungers to their normal position.

36. In a machine of the class described, the combination of a plurality of fixed guides; a plurality of non-revoluble needles slidable therein having hooked operating ends; a bar to which the rear ends of said needles are secured: a track therefor; and a lever for moving said needles lengthwise in said guides.

37. In a machine of the class described, the combination of a plurality of non-revoluble needles having hooked operating ends; guides in which said needles are movable lengthwise; a pivoted lever for moving said needles having a slot in its lower end; a crank having a pin in said slot; and means for rotating said crank and providing for a standstill thereof during each cycle.

38. In a machine of the class described, the combination of a plurality of non-revoluble needles having hooked operating ends; guides in which said needles are movable lengthwise; a pivoted lever for moving said needles having a slot in its lower end; a crank having a pin in said slot; an interrupted pinion revoluble with said crank; and an interrupted gear meshing therewith.

39. In a machine of the class described, a revoluble shaft; a member revoluble therewith provided with means for positioning an egg case filler; means for feeding strips through slits in the walls of said filler; an interrupted gear secured to said shaft; an interrupted driving pinion therefor; and means for rotating said driving pinion.

40. In a machine of the class described, a revoluble shaft; a member revoluble therewith provided with means for positioning an egg case filler; means for feeding strips through slits in the walls of said filler; an interrupted gear secured to said shaft; an interrupted driving pinion therefor; a notched disk revoluble with said shaft and provided with a peripheral notch; a locking bolt coacting with said notch; means revoluble with said driving pinion for releasing said bolt from said notch; and means for rotating said driving pinion.

41. In a machine of the class described, a revoluble shaft; a member revoluble therewith provided with means for positioning an egg case filler; means for feeding strips through slits in the walls of said filler; means for intermittently rotating said revoluble member; and means carried by said revoluble member for discharging said filler at a predetermined point in its rotation.

42. In a machine of the class described, a revoluble shaft; a flat-sided member revoluble therewith provided with means for positioning an egg case filler; means for feeding strips through slits in the walls of said filler; means for intermittently rotating said revoluble member; and bars in recesses at the opposite ends of said revoluble member adapted to be moved outwardly at a predetermined time to discharge the filler.

43. In a machine of the class described, a revoluble shaft; a flat-sided member revoluble therewith provided with means for positioning an egg case filler; means for feeding strips through slits in the walls of said filler; means for intermittently rotating said revoluble member; bars in recesses at the opposite ends of said revoluble member adapted to be moved outwardly at a predetermined time to discharge the filler; guides for said bars; and springs for returning them to their normal position.

44. In a machine of the class described, a revoluble shaft; a flat-sided member revoluble therewith provided with means for positioning an egg case filler; means for feeding strips through slits in the walls of said filler; means for intermittently rotating said revoluable member; bars in recesses at the opposite ends of said revoluble member; and a reciprocating frame provided with projections to engage said bars and move them outwardly at a predetermined time.

45. In a machine of the class described, a revoluble shaft; a member revoluble therewith provided with means on its sides for positioning an egg case filler and having annular recesses in its ends; reciprocating bars at each end having curved recesses normally registering with said annular recesses and provided with roller receiving pockets; a reciprocating frame provided with rollers normally positioned in said recesses and adapted on its downward movement to move said rollers into said pockets and cause an outward movement of said bars; and means for returning said bars to their normal position prior to another rotation of said revoluble member.

46. In a machine of the class described, a revoluble shaft; a member revoluble therewith provided with side members adapted to position egg case fillers and having depressions in opposite ends thereof adjacent the sides thereof; a bar normally positioned in each depression, said bars and the ends of said revoluble member having annular roller receiving recesses; a reciprocating frame having rollers normally extending into said annular recesses whereby said revoluble member is free to be rotated; means operable while said revoluble member is at a standstill for moving said frame downwardly and causing said rollers to engage said bars and move them outwardly thereby removing the filler from the positioning members; and means for subsequently returning said bars to their normal position.

47. In a machine of the class described, a revoluble member adapted to support an egg case filler; a hopper having a plurality of inclined compartments adapted to contain strips; and means for moving said strips from said compartments through slits in the walls of said fillers.

48. In a machine of the class described, a revoluble member adapted to support an egg case filler; a hopper having a plurality of inclined compartments adapted to contain strips; and a plurality of reciprocating members for moving said strips from said compartments through slits in the walls of said fillers.

49. In a machine of the class described, a revoluble member adapted to support an egg case filler; a hopper opposite each end of said revoluble member having a plurality of inclined compartments adapted to contain strips; and means for moving said strips from said compartments through slits in the walls of said fillers.

50. In a machine of the class described, a revoluble member adapted to support an egg case filler; a hopper opposite each end of said revoluble member having a plurality of inclined compartments adapted to contain strips; and a plurality of reciprocating members for moving said strips from said compartments through slits in the walls of said fillers.

51. In a machine of the class described, a revoluble member adapted to support an egg case filler; hoppers at the opposite ends of said member, having strip containing compartments inclined in opposite directions; and means for simultaneously moving strips from both hoppers toward each other and through slits in the walls of said filler.

52. In a machine of the class described, a revoluble member adapted to support an egg case filler; hoppers at the opposite ends of said member having strip containing compartments; a hopper at one side of said revoluble member having a plurality of strip containing compartments; and means for simultaneously moving strips from all of said compartments through slits in the walls of said filler.

53. In a machine of the class described, a revoluble member adapted to support an egg case filler; hoppers at the opposite ends of said member having strip containing compartments inclined in opposite directions; a hopper at one side of said revoluble member having a plurality of strip containing compartments; and means for simultaneously moving strips from all of said compartments through slits in the walls of said filler.

54. In a machine of the class described, a revoluble member adapted to support an egg case filler; hoppers at the opposite ends of said member having strip containing compartments; means for projecting selected strips through the walls of said hoppers; and means for seizing said projected strips and positioning them in slits in the walls of said filler.

55. In a machine of the class described, a revoluble member adapted to support an egg case filler; hoppers at the opposite ends of said member having strip containing compartments inclined in opposite directions; means for projecting selected strips through the walls of said hoppers; and means for seizing said projected strips and positioning them in slits in the walls of said filler.

56. In a machine of the class described, a revoluble member adapted to support an egg case filler; hoppers at the opposite ends of said member having strip containing compartments; two sets of reciprocating needles adapted to seize said strips and draw them through slits in the walls of said filler; and means secured to each set of said needles and moving therewith to project said strips from said compartments into position to be seized by the other set of needles.

57. In a machine of the class described, a revoluble member adapted to support an egg case filler; hoppers at the opposite ends of said member having strip containing compartments; two sets of reciprocating needles adapted to seize said strips and draw them through slits in the walls of said filler; and a plurality of pushers secured to each set of said needles and moving therewith to project said strips from said compartments into position to be seized by the other set of needles.

58. In a machine of the class described, a revoluble member adapted to support an egg case filler; hoppers at the opposite ends of said member having strip containing compartments; two sets of reciprocating needles to seize said strips and draw them through slits in the walls of said filler; and a plurality of pushers secured to each set of said needles and moving therewith through slits in the walls of said compartments to project said strips from said compartments into position to be seized by the other set of needles.

59. In a machine of the class described, a revoluble member adapted to support an egg case filler; hoppers at the opposite ends of said member having strip containing compartments; two sets of reciprocating needles adapted to seize said strips and draw them through slits in the walls of said filler; means secured to each set of said needles and moving therewith to project said strips from said compartments into position to be seized by the other set of needles; and means for holding the projected ends of said strips until seized by said needles.

60. In a machine of the class described, a revoluble member adapted to support an egg case filler; hoppers at the opposite ends of said member having strip containing compartments; two sets of reciprocating needles adapted to seize said strips and draw them through slits in the walls of said filler; means secured to each set of said needles and moving therewith to project said strips from said compartments into position to be seized by the other set of needles; and yielding means for holding the projected ends of said strips until seized by said needles.

61. In a machine of the class described, a revoluble member adapted to support an egg case filler; hoppers at the opposite ends of said member having strip containing compartments and discharge slits in the walls thereof; a fixed plate at one side of each slit; a spring pressed plate coacting therewith; means for pushing strips from said compartments between said plates; and reciprocating needles adapted to seize the projected ends of said strips and position said strips in slits in the walls of said filler.

62. In a machine of the class described, a revoluble member adapted to support an egg case filler; hoppers at the opposite ends of said member having strip containing compartments and discharge slits in the walls thereof; a fixed plate at one side of each slit; a spring pressed plate coacting therewith; means for pushing strips from said compartments between said plates; and reciprocating needles the ends of which are adapted to enter between said plates and seize the projected ends of said strips and position said strips in slits in the walls of said filler.

63. In a machine of the class described, a revoluble member adapted to support an egg case filler; hoppers at the opposite ends of said member having strip containing compartments and discharge slits in the walls thereof; a fixed plate at one side of each slit; a movable plate co-acting therewith; a rod secured thereto; a housing therefor; a spring between said housing and movable plate; means for pushing strips from said compartments between said plates; and reciprocating needles adapted to seize the projected ends of said strips and position said strips in slits in the walls of said filler.

64. In a machine of the class described, a revoluble member adapted to support an egg case filler; hoppers at the opposite ends of said member having strip containing compartments and discharge slits in the walls thereof; a fixed plate at one side of each slit; a movable plate co-acting therewith; a rod secured thereto; a housing therefor; means for adjusting said housing; a spring between said housing and movable plate; means for pushing strips from said compartments between said plates; and reciprocating needles adapted to seize the projected ends of said strips and position said strips in slits in the walls of said filler.

65. In a machine of the class described, a revoluble member adapted to support an egg case filler; hoppers at the opposite ends of said member having strip containing compartments and discharge slits in the walls thereof; a fixed plate at one side of each slit provided with needle positioning means; a spring pressed plate coacting therewith; means for pushing strips from said compartments between said plates; and reciprocating needles adapted to seize the projected ends of said strips and position said strips in slits in the walls of said filler.

66. In a machine of the class described, a revoluble member adapted to support an egg case filler; hoppers containing strips; a plurality of needles for seizing said strips and positioning them in slits in the walls of said filler; and means for subsequently disengaging said strips from said needles.

67. In a machine of the class described, a revoluble member adapted to support an egg case filler; hoppers containing strips; a plurality of needles for seizing said strips and positioning them in slits in the walls of said filler; and members having inclined walls in the path of the strips for subsequently disengaging said strips from said needles.

68. In a machine of the class described, a revoluble member adapted to support an egg case filler; hoppers containing strips; a plurality of needles having hooks adapted to engage notches in the ends of said strips and positioning them in slits in the walls of said filler; and members having inclined walls in the path of said strips adapted to disengage said hooks from said notches.

69. In a machine of the class described, a revoluble member adapted to support an egg case filler; hoppers containing strips provided with notches at one end; means for projecting selected strips from said hoppers; yielding means for temporarily holding the projected ends of said strips; a pair of reciprocating needles for each strip having hooked ends adapted to engage said notches; and means for disengaging said hooked end from said notches at a predetermined time.

70. In a machine of the class described, a revoluble member adapted to support an egg case filler; hoppers at opposite ends thereof having strip containing compartments inclined in opposite directions; two sets of needles in pairs each pair of which is adapted to pass through alined slits in the walls of said filler and seize a strip and then withdraw it from its compartment through said alined slits; and means for disengaging said needles from said strips when the latter have been properly positioned in the slits of said filler.

71. In a machine of the class described, a revoluble member adapted to support an egg case filler; hoppers at opposite ends thereof having strips containing compartments inclined in opposite directions; two sets of needles in pairs each pair of which is inclined and adapted to pass through alined slits in the walls of said filler and seize a strip and then withdraw it from its compartment through said alined slits; and means for disengaging said needles from said strips when the latter have been properly positioned in the slits of said filler.

72. In a machine of the class described, a revoluble member adapted to support an egg case filler; hoppers at opposite ends thereof having strip containing compartments inclined in opposite directions; two sets of needles in pairs each pair of which is adapted to pass through alined slits in the walls of said filler and seize a strip and then withdraw it from its compartment through said alined slits, said pairs of needles being alternately disposed in said sets; and means for disengaging said needles from said strips when the latter have been properly positioned in the slits of said filler.

73. In a machine of the class described, a revoluble member adapted to support an egg case filler: hoppers at opposite ends thereof containing strips; two sets of needles in pairs each pair of which is adapted to pass through alined slits in the walls of said filler, seize a strip, and position it in said alined slits; a bar connecting all the needles of each set; a pivoted lever the upper end of which is pivotally connected to each bar; a crank for actuating each lever; and means for intermittently rotating both cranks.

74. In a machine of the class described; a revoluble member adapted to support an egg case filler; hoppers at opposite ends thereof containing strips; two sets of needles in pairs each pair of which is adapted to pass through alined slits in the walls of said filler, seize a strip, and position it in said alined slits; a bar connecting all the needles of each set; a pivoted lever the upper end of which is pivotally connected to each bar; a crank for actuating each lever; an interrupted pinion revoluble with each crank; an interrupted gear meshing therewith; and means for simultaneously rotating said gears.

75. In a machine of the class described, the combination of a revoluble member; a plurality of separated blocks secured thereto and adapted to position an egg case filler, each block having a transverse depression in its outer end; a movable frame provided with a plurality of projecting blocks each adapted to enter one of said recesses and form therewith transverse inclined slits; and means passing through said slits for positioning a strip in slits in the walls of said filler.

76. In a machine of the class described, the combination of a revoluble member; a plurality of separated blocks secured thereto and adapted to position an egg case filler, each block having a transverse depression in its outer end; a movable frame provided with a plurality of projecting blocks each adapted to enter one of said recesses and form therewith transverse inclined slits and needle receiving openings; and needles passing through said openings adapted to seize strips and position them in slits in the walls of said filler.

77. In a machine of the class described, the combination of a revoluble member; a plurality of separated blocks secured thereto and adapted to position an egg case filler, each block having a transverse depression in its outer end; a movable frame provided with a plurality of projecting blocks each adapted to enter one of said recesses and form therewith transverse inclined slits; means passing through said slits for positioning a strip in slits in the walls of said filler; and means carried by said frame at the opposite ends of the rows of said projecting blocks for disengaging the strips from said positioning means.

78. In a machine of the class described, the combination of a revoluble member; a plurality of separated blocks secured thereto and adapted to position an egg case filler, each block having a transverse depression in its outer end; a movable frame provided with a plurality of projecting blocks each adapted to enter one of said recesses and form therewith transverse inclined slits; members passing through said slits for positioning a strip in slits in the walls of said filler; and means carried by said frame at the opposite ends of the rows of said projecting blocks for positioning the strip positioning members on their forward movement and disengaging the strips from said members on their return movement.

79. In a machine of the class described, the combination of a revoluble member; a plurality of separated blocks secured thereto and adapted to position an egg case filler, each block having a transverse depression in its outer end; a movable frame provided with a plurality of projecting blocks each adapted to enter one of said recesses and form therewith transverse inclined slits; means passing through said slits for positioning a strip in the walls of said filler; and a revoluble arm adapted to control the movement of said frame.

80. In a machine of the class described, the combination of a revoluble member; a plurality of separated blocks secured thereto and adapted to position an egg case filler, each block having a transverse depression in its outer end; a movable frame provided with a plurality of projecting blocks each adapted to enter one of said recesses and form therewith transverse inclined slits; means passing through said slits for positioning a strip in the walls of said filler; and a revoluble member having two arms adapted to control the movement of said frame.

81. In a machine of the class described, the combination of a revoluble member; a plurality of separated blocks secured thereto and adapted to position an egg case filler, each block having a transverse depression in its outer end; a movable frame provided with a plurality of projecting blocks each adapted to enter one of said recesses and form therewith transverse inclined slits, said frame having a flat bearing surface and a curved surface; means passing through said slits for positioning a strip in the walls of said filler; and a revoluble member having a roller adapted to coact with said surfaces.

82. In a machine of the class described, the combination of a revoluble member; a plurality of separated blocks secured thereto and adapted to position an egg case filler, each block having a transverse depression in its outer end; a movable frame provided with a plurality of projecting blocks each adapted to enter one of said recesses and form therewith transverse inclined slits, said frame having a flat bearing surface and a curved surface and being also provided with a projecting member having a cam face opposite said surfaces; means passing through said slits for positioning a strip in the walls of said filler; and a revoluble member having two roller carrying arms one of which is adapted to coact with said surfaces and the other of which is adapted to coact with said projecting member.

83. In a machine of the class described, the combination of a revoluble member; a plurality of separated blocks secured thereto and adapted to position an egg case filler, each block having a transverse depression in its outer end; a movable frame provided with a plurality of projecting blocks each adapted to enter one of said recesses and form therewith transverse inclined slits; means passing through said slits for positioning a strip in the walls of said filler; and means for raising and lowering said frame and providing a standstill thereof at the end of its movement in each direction.

84. In a machine of the class described, the combination of a revoluble support adapted to carry an egg case filler; a plurality of compartments containing strips; and means for withdrawing a strip from each compartment and positioning it in slits in the walls of said filler.

85. In a machine of the class described, the combination of a flat-sided member; separated blocks secured thereto having parallel slits therein provided with enlarged needle receiving openings; compartments containing strips; needles movable through said openings adapted to seize strips from said compartments and position them in the slits in said blocks and in slits in the walls of an egg case filler positioned on said blocks; a reciprocating member provided with means for removing the under strips from said compartments, the upper face of said reciprocating member being provided with grooves alined with said compartments; a guide for each strip; and a tongue thereon with its free end in a groove.

86. In a machine of the class described, the combination of a plurality of fixed guides; a plurality of non-revoluble needles slidable therein; two alined bars secured to said needles and having abutting trunnions; a roller on said trunnions; and a lever for moving said needles lengthwise in said guides, said lever being provided with a slot in which said roller is positioned.

87. In a machine of the class described, the combination of a plurality of non-revoluble needles; guides in which said needles are movable lengthwise; a pivoted lever for moving said needles having a slot in each end; a crank having a pin in one of said slots; means for rotating said crank and providing for a standstill thereof during each cycle; a member secured to said needles and movable therewith; and a roller mounted on said member and positioned in the other slot of said lever.

88. In a machine of the class described, a revoluble shaft; a member revoluble therewith provided with means for positioning an egg case filler; means for feeding strips through slits in the walls of said filler; and means for intermittently rotating said shaft and providing a standstill of said member for a predetermined time between successive rotations.

89. In a machine of the class described, a flat-sided member provided with means for positioning an egg case filler; means for feeding strips through slits in the walls of said filler; and bars in recesses at the opposite ends of said flat-sided member adapted to be moved outwardly at a predetermined time to discharge the filler.

90. In a machine of the class described, a flat-sided member provided with means for positioning an egg case filler; means for feeding strips through slits in the walls of said filler; bars in recesses at the opposite ends of said revoluble member adapted to be moved outwardly at a predetermined time to discharge the filler; guides for said bars; and springs for returning them to their normal position.

91. In a machine of the class described, a member adapted to support an egg case filler; a hopper opposite each end of said member having a plurality of inclined compartments adapted to contain strips; and a plurality of reciprocating members for moving said strips from said compartments through slits in the walls of said fillers.

92. In a machine of the class described, a member adapted to support an egg case filler; hoppers at the opposite ends of said member, having strip containing compartments inclined in opposite directions; and means for simultaneously moving strips from both hoppers toward each other and through slits in the walls of said filler.

93. In a machine of the class described, a member adapted to support an egg case filler; hoppers at the opposite ends of said member having strip containing compartments; a hopper at one side of said revoluble member having a plurality of strip containing compartments; and means for simultaneously moving strips from all of said compartments through slits in the walls of said filler.

94. In a machine of the class described, a member adapted to support an egg case filler; hoppers at the opposite ends of said member having strip containing compartments; means for projecting selected strips through the walls of said hoppers; and means for seizing said projected strips and positioning them in slits in the walls of said filler.

95. In a machine of the class described, a member adapted to support an egg case filler; hoppers at the opposite ends of said member having strip containing compartments; two sets of reciprocating needles adapted to seize said strips and draw them through slits in the walls of said filler; and means secured to each set of said needles and moving therewith to project said strips from said compartments into position to be seized by the other set of needles.

96. In a machine of the class described, a member adapted to support an egg case filler; hoppers at the opposite ends of said member having strip containing compartments; two sets of reciprocating needles to seize said strips and draw them through slits in the walls of said filler; and a plurality of pushers secured to each set of said needles and moving therewith through slits in the walls of said compartments to project said strips from said compartments into position to be seized by the other set of needles.

97. In a machine of the class described, a member adapted to support an egg case filler; hoppers at the opposite ends of said member having strip containing compartments; two sets of reciprocating needles adapted to seize said strips and draw them through slits in the walls of said filler; means secured to each set of said needles and moving therewith to project said strips from said compartments into position to be seized by the other set of needles; and yielding means for holding the projected ends of said strips until seized by said needles.

98. In a machine of the class described, a flat member adapted to support an egg case filler; hoppers at the opposite ends of said member having strip containing compartments and discharge slits in the walls thereof; a fixed plate at one side of each slit; a movable plate coacting therewith; a rod secured thereto; a housing therefor; a spring between said housing and movable plate; means for pushing strips from said compartments between said plates; and reciprocating needles adapted to seize the projected ends of said strips and position said strips in slits in the walls of said filler.

99. In a machine of the class described, a member adapted to support an egg case filler; hoppers containing strips; a plurality of needles for seizing said strips and positioning them in slits in the walls of said filler; and means for subsequently disengaging said strips from said needles.

100. In a machine of the class described, a member adapted to support an egg case filler; hoppers containing strips; a plurality of needles for seizing said strips and positioning them in slits in the walls of said filler; and members having inclined walls in the path of the strips for subsequently disengaging said strips from said needles.

101. In a machine of the class described, a member adapted to support an egg case filler; hoppers containing strips; a plurality of needles having hooks adapted to engage notches in the ends of said strips and positioning them in slits in the walls of said filler; and members having inclined walls in the path of said strips adapted to disengage said hooks from said notches.

102. In a machine of the class described, a member adapted to support an egg case filler; hoppers at opposite ends thereof having strip containing compartments inclined in opposite directions; two sets of needles in pairs each pair of which is adapted to pass through alined slits in the walls of said filler and seize a strip and then withdraw it from its compartment through said alined slits; and means for disengaging said needles from said strips when the latter have been properly positioned in the slits of said filler.

103. In a machine of the class described, the combination of a flat-sided member; a plurality of separated blocks secured thereto and adapted to position an egg case filler, each block having a transverse depression in its outer end; a movable frame provided with a plurality of projecting blocks each adapted to enter one of said recesses and form therewith transverse inclined slits; means passing through said slits for positioning a strip in slits in the walls of said filler; and means carried by said frame at the opposite ends of the rows of said projecting blocks for disengaging the strips from said needles.

104. In a machine of the class described, the combination of a flat-sided member; a plurality of separated blocks secured thereto and adapted to position an egg case filler, each block having a transverse depression in its outer end; a movable frame provided with a plurality of projecting blocks each adapted to enter one of said recesses and form therewith transverse inclined slits; means passing through said slits for positioning a strip in the walls of said filler; and a revoluble arm adapted to control the movement of said frame.

105. In a machine of the class described, the combination of a flat-sided member; a plurality of separated blocks secured thereto and adapted to position an egg case filler, each block having a transverse depression in its outer end; a movable frame provided with a plurality of projecting blocks each adapted to enter one of said recesses and form therewith transverse inclined slits; means passing through said slits for positioning a strip in the walls of said filler; and a revoluble member having two arms adapted to control the movement of said frame.

106. In a machine of the class described, the combination of a support adapted to carry an egg case filler; a plurality of compartments containing strips; and means for simultaneously withdrawing strips from all of said compartments and positioning them in slits in the walls of said filler.

107. In a machine of the class described, the combination of a support adapted to carry an egg case filler; a plurality of compartments at the front and each side of said support and containing strips, said side compartments being inclined in opposite directions; and means for simultaneously withdrawing strips from all of said compartments and positioning them in slits in the walls of said filler.

108. In a machine of the class described, the combination of a flat-sided member provided with a plurality of separated blocks adapted to position an egg case filler, the walls of which are provided with a plurality of slits; a hopper having a plurality of compartments containing strips; means for removing selected strips from said compartments; needles for seizing said strips and inserting them in the slits in said filler; a lever for operating said needles; a cam arm secured thereto; a carriage controlling the operation of said strip removing means; and a pair of separated rollers on said carriage adapted to be alternately engaged by said arm in the movement of said lever about its pivot.

109. In a machine of the class described, the combination of a flat-sided member provided with a plurality of separated blocks adapted to position an egg case filler the walls of which are provided with a plurality of slits; a hopper having a plurality of compartments containing strips; means for removing selected strips from said compartments; needles for seizing said strips and inserting them in the slits in said filler; a lever for operating said needles; a cam arm secured thereto; a carriage controlling the operation of said strip removing means; means for varying the length of said carriage; and a pair of separated rollers on said carriage adapted to be alternately engaged by said arm in the movement of said lever about its pivot.

110. In a machine of the class described, the combination of a flat-sided member provided with a plurality of separated blocks adapted to position an egg case filler the walls of which are provided with a plurality of slits; a hopper having a plurality of compartments containing strips; means for removing selected strips from said compartments; needles for seizing said strips and inserting them in the slits in said filler; a lever for operating said needles; a cam arm secured thereto; a carriage controlling the operation of said strip removing means; a pair of separated rollers on said carriage adapted to be alternately engaged by said arm in the movement of said lever about its pivot; and means for varying the distance between said rollers.

111. In a machine of the class described, a revoluble shaft; a member thereon provided with means for positioning an egg case filler thereon; hoppers containing strips to be positioned in slits in the walls of said fillers; means for positioning said strips in said slits; and a driving shaft for rotating said revoluble shaft and operating said strip positioning means.

112. In a machine of the class described, a revoluble shaft; a member thereon provided with means for positioning an egg case filler thereon; hoppers containing strips to be positioned in slits in the walls of said fillers; means for positioning said strips in said slits; a driving shaft for rotating said revoluble shaft and operating said strip positioning means; a motor; and means for connecting and disconnecting said motor from said driving shaft.

113. In a machine of the class described, a revoluble shaft; a member thereon provided with means for positioning an egg case filler thereon; hoppers containing strips to be positioned in slits in the walls of said fillers; means for positioning said strips in said slits; a driving shaft for rotating said revoluble shaft and operating said strip positioning means; a motor; a clutch between said motor and driving shaft; and a manually operated lever for actuating said clutch.

114. In a machine of the class described, a revoluble shaft; a member thereon provided with means for positioning an egg case filler thereon; hoppers containing strips to be positioned in slits in the walls of said fillers; means for positioning said strips in said slits; a driving shaft for rotating said revoluble shaft and operating said strip positioning means; a motor; a clutch between said motor and driving shaft; a manually operated lever for actuating said clutch to rotate said driving shaft; and means for quickly disengaging said clutch.

115. In a machine of the class described, a revoluble shaft; a member thereon provided with means for positioning an egg case filler thereon; hoppers containing strips to be positioned in slits in the walls of said fillers; means for positioning said strips in said slits; a driving shaft for rotating said revoluble shaft and operating said strip positioning means; a motor; a clutch between said motor and driving shaft; a manually operated lever for actuating said clutch; a pivoted member coacting with said lever to retain said clutch in engagement; means for removing said pivoted member from the path of said lever; and means for quickly moving said lever when said member has been moved from its path and thereby disengaging said clutch.

116. In a machine of the class described, a revoluble shaft; a member thereon provided with means for positioning an egg case filler thereon; hoppers containing strips to be positioned in slits in the walls of said fillers; means for positioning said strips in said slits; a driving shaft for rotating said revoluble shaft and operating said strip positioning means; a motor; a clutch between said motor and driving shaft; a manually operated lever for actuating said clutch; a pivoted member coacting with said lever to retain said clutch in engagement; treadle mechanism for removing said pivoted member from the path of said lever; and means for quickly moving said lever when said member has been moved from its path and thereby disengaging said clutch.

117. In a machine of the class described, a revoluble shaft; a member thereon provided with means for positioning an egg case filler thereon; hoppers containing strips to be positioned in slits in the walls of said fillers; means for positioning said strips in said slits; a driving shaft for rotating said revoluble shaft and operating said strip positioning means; a motor; a clutch between said motor and driving shaft; a manually operated lever for actuating said clutch; a pivoted member coacting with said lever to retain said clutch in engagement; a spring for normally retaining said member in the path of said lever; means for removing said pivoted member from the path of said lever; and means for quickly moving said lever when said member has been moved from its path and thereby disengaging said clutch.

118. In a machine of the class described, a revoluble shaft; a member thereon provided with means for positioning an egg case filler thereon; hoppers containing strips to be positioned in slits in the walls of said fillers; means for positioning said strips in said slits; a driving shaft for rotating said revoluble shaft and operating said strip positioning means; a motor; a clutch between said motor and driving shaft; a manually operated lever for actuating said clutch; a pivoted member coacting with said lever to retain said clutch in engagement; means for removing said pivoted member from the path of said lever; and a spring for quickly moving said lever when said member has been moved from its path and thereby disengaging said clutch.

119. In a machine of the class described, a revoluble shaft; a member thereon provided with means for positioning an egg case filler thereon; hoppers containing strips to be positioned in slits in the walls of said fillers; means for positioning said strips in said slits; a driving shaft for rotating said revoluble shaft and operating said strip positioning means; a motor; a clutch between said motor and driving shaft; a pivoted lever for engaging said clutch; a spring secured to said lever and adapted to move it to disengage the clutch; a pivoted member coacting with said lever; a spring secured to said pivoted member and normally retaining it in the path of said lever; and treadle mechanism connected to said pivoted member and adapted to move it from the path of said lever.

120. In a machine of the class described, a revoluble shaft; a member thereon provided with means for positioning an egg case filler thereon; hoppers containing strips to be positioned in slits in the walls of said fillers; means for positioning said strips in said slits; a driving shaft for rotating said revoluble shaft and operating said strip positioning means; a motor; a clutch between said motor and driving shaft; a pivoted lever for engaging said clutch; a spring secured to said lever and adapted to move it to disengage the clutch; a pivoted member coacting with said lever; a roller at the movable end of said pivoted member; a spring secured to said pivoted member and normally retaining it in the path of said lever; and treadle mechanism connected to said pivoted member and adapted to move it from the path of said lever.

121. In a machine of the class described, a revoluble shaft; a member thereon provided with means for positioning an egg case filler thereon; hoppers containing strips to be positioned in slits in the walls of said fillers; means for positioning said strips in said slits; a driving shaft for rotating said revoluble shaft and operating said strip positioning means; a motor; a clutch between said motor and driving shaft; a pivoted lever for engaging said clutch; a block depending from said lever; a roller therein; a spring secured to said lever and adapted to move it to disengage the clutch; a pivoted member coacting with said lever; a roller at the movable end of said pivoted member adapted to coact with said block; a spring secured to said pivoted member and normally retaining it in the path of said lever; and treadle mechanism connected to said pivoted member and adapted to move it from the path of said lever.

122. In a machine of the class described, a revoluble shaft; a member thereon provided with means for positioning an egg case filler thereon; hoppers containing strips to be positioned in slits in the walls of said fillers; means for positioning said strips in said slits; a driving shaft for rotating said revoluble shaft and operating said strip positioning means; a motor; a worm driven thereby; a worm gear meshing therewith and loosely mounted on said driving shaft and having secured thereto one part of a clutch; a second part of a clutch slidable upon said driving shaft and revoluble therewith; and means under the control of the operator for regulating the sliding movement of the slidable part of the clutch.

Signed by me at 4 Post Office Sq., Boston, Mass., this 25th day of October, 1916.

GEORGE W. BOWERS.

Witnesses:
WALTER E. LOMBARD,
NATHAN C. LOMBARD.